(12) United States Patent
Bevirt et al.

(10) Patent No.: US 12,280,885 B2
(45) Date of Patent: Apr. 22, 2025

(54) SYSTEM AND METHOD FOR AIRCRAFT NOISE MITIGATION

(71) Applicant: Joby Aero, Inc., Santa Cruz, CA (US)

(72) Inventors: JoeBen Bevirt, Santa Cruz, CA (US);
Gregor Veble Mikic, Santa Cruz, CA (US); Jason Ryan, Santa Cruz, CA (US); Alex Stoll, Santa Cruz, CA (US);
Rob Thodal, Santa Cruz, CA (US);
Jeremy Bain, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 286 days.

(21) Appl. No.: 17/065,172

(22) Filed: Oct. 7, 2020

(65) Prior Publication Data
US 2021/0078715 A1 Mar. 18, 2021

Related U.S. Application Data

(62) Division of application No. 16/430,163, filed on Jun. 3, 2019, now Pat. No. 10,843,807.
(Continued)

(51) Int. Cl.
*B64D 31/06* (2024.01)
*B64C 11/50* (2006.01)

(52) U.S. Cl.
CPC ............. *B64D 31/06* (2013.01); *B64C 11/50* (2013.01); *B64C 2220/00* (2013.01)

(58) Field of Classification Search
CPC .............. B64C 2220/00; B64C 11/50; B64C 2201/108; B64C 2201/024;
(Continued)

(56) References Cited

U.S. PATENT DOCUMENTS

| | | |
|---|---|---|
| 1,386,713 A | 8/1921 | Leinweber et al. |
| 1,496,723 A | 6/1924 | Miller |

(Continued)

FOREIGN PATENT DOCUMENTS

| | | | |
|---|---|---|---|
| CH | 677844 A5 * | 1/1989 | ............ B64D 27/04 |
| CN | 103363993 B | 4/2016 | |

(Continued)

OTHER PUBLICATIONS

Kim, "Reduction of Tonal Propeller Noise by Means of Uneven Blade Spacing", (Year: 2016).*

(Continued)

*Primary Examiner* — Assres H Woldemaryam
(74) *Attorney, Agent, or Firm* — Michael A. Guth

(57) ABSTRACT

A system and method for reducing a psychoacoustic penalty of acoustic noise emitted by an aircraft, including a plurality of propulsion assemblies coupled to the aircraft, wherein each of the plurality of propulsion assemblies includes a motor, and a plurality of blades defined by a propeller, wherein the plurality of blades can define an asymmetric blade spacing; a control subsystem coupled to the aircraft and communicatively coupled to the motor of each of the plurality of propulsion assemblies, wherein the control subsystem is operable to rotate each of the plurality of propulsion assemblies at a different frequency to modulate the acoustic power distribution of the emitted acoustic signature.

11 Claims, 6 Drawing Sheets

Related U.S. Application Data

(60) Provisional application No. 62/679,411, filed on Jun. 1, 2018.

(58) Field of Classification Search
CPC .............. B64C 2230/14; B64C 27/001; B64C 2201/042; B64C 2230/28; B64D 31/06; G10K 2210/1281; G10K 11/17823; G10K 11/175; G10K 11/1781; G10K 2210/121; G10K 2210/3046
See application file for complete search history.

(56) References Cited

U.S. PATENT DOCUMENTS

| | | | |
|---|---|---|---|
| 1,794,202 A | 2/1931 | Pickard | |
| D171,509 S | 2/1954 | Lightbourn et al. | |
| 2,868,476 A | 1/1959 | Schlieben | |
| 2,969,935 A | 1/1961 | Price | |
| 2,981,339 A | 4/1961 | Kaplan | |
| 3,002,712 A | 10/1961 | Sterling | |
| 3,035,789 A | 5/1962 | Young | |
| 3,059,876 A | 10/1962 | Platt | |
| 3,081,964 A | 3/1963 | Quenzler | |
| 3,082,977 A | 3/1963 | Melvin | |
| 3,089,666 A | 5/1963 | Quenzler | |
| 3,136,499 A | 6/1964 | Kessler | |
| 3,141,633 A | 7/1964 | Mackay | |
| 3,159,361 A | 12/1964 | Weiland | |
| 3,181,810 A | 5/1965 | Olson | |
| 3,231,221 A | 1/1966 | Platt | |
| 3,259,343 A | 7/1966 | Roppel | |
| 3,350,035 A | 10/1967 | Schlieben | |
| 3,360,217 A | 12/1967 | Trotter | |
| 3,404,852 A | 10/1968 | Sambell et al. | |
| 3,592,412 A | 7/1971 | Glatfelter | |
| 3,693,910 A | 9/1972 | Aldi | |
| 3,795,372 A | 3/1974 | Feldman | |
| 3,834,654 A | 9/1974 | Miranda | |
| 3,856,238 A | 12/1974 | Malvestuto | |
| 4,022,405 A | 5/1977 | Peterson | |
| 4,047,840 A | 9/1977 | Ravenhall et al. | |
| 4,053,125 A | 10/1977 | Ratony | |
| 4,146,199 A | 3/1979 | Wenzel | |
| 4,356,546 A | 10/1982 | Whiteside et al. | |
| 4,387,866 A | 6/1983 | Eickmann | |
| 4,459,083 A | 7/1984 | Bingham | |
| 4,519,746 A | 5/1985 | Wainauski et al. | |
| 4,569,633 A | 2/1986 | Flemming | |
| 4,667,909 A | 5/1987 | Curci | |
| 4,784,351 A | 11/1988 | Eickmann | |
| 4,799,629 A | 1/1989 | Mori | |
| 4,914,657 A | 4/1990 | Walter et al. | |
| 4,925,131 A | 5/1990 | Eickmann | |
| 4,979,698 A | 12/1990 | Lederman | |
| 4,982,914 A | 1/1991 | Eickmann | |
| 5,001,646 A | 3/1991 | Caldwell et al. | |
| 5,031,858 A | 7/1991 | Schellhase et al. | |
| 5,082,079 A | 1/1992 | Lissaman et al. | |
| 5,085,315 A | 2/1992 | Sambell | |
| 5,141,176 A | 8/1992 | Kress et al. | |
| 5,156,363 A | 10/1992 | Cizewski et al. | |
| 5,174,721 A | 12/1992 | Brocklehurst | |
| 5,184,304 A | 2/1993 | Huddle | |
| 5,374,010 A | 12/1994 | Stone et al. | |
| 5,381,985 A | 1/1995 | Wechsler et al. | |
| 5,405,105 A | 4/1995 | Kress | |
| 5,419,514 A | 5/1995 | Duncan | |
| 5,472,156 A | 12/1995 | Bivens et al. | |
| 5,515,282 A | 5/1996 | Jackson | |
| 5,715,162 A * | 2/1998 | Daigle ................... B64C 11/34 244/180 | |
| 5,806,805 A | 9/1998 | Elbert et al. | |
| 5,823,468 A | 10/1998 | Bothe | |
| 5,839,691 A | 11/1998 | Lariviere | |
| 5,842,667 A | 12/1998 | Jones | |
| 5,868,351 A | 2/1999 | Stamps et al. | |
| 6,098,923 A | 8/2000 | Peters | |
| 6,254,032 B1 | 7/2001 | Bucher | |
| 6,260,796 B1 | 7/2001 | Klingensmith | |
| 6,276,633 B1 | 8/2001 | Balayn et al. | |
| 6,286,783 B1 | 9/2001 | Kuenkler | |
| 6,293,491 B1 | 9/2001 | Wobben | |
| 6,343,127 B1 * | 1/2002 | Billoud ................ G10K 11/178 381/71.4 | |
| 6,402,088 B1 | 6/2002 | Syrovy et al. | |
| 6,460,810 B2 | 10/2002 | James | |
| 6,474,604 B1 | 11/2002 | Carlow | |
| 6,561,455 B2 | 5/2003 | Capanna | |
| 6,625,033 B1 | 9/2003 | Steinman | |
| 6,655,631 B2 | 12/2003 | Austen-Brown | |
| 6,719,244 B1 | 4/2004 | Gress | |
| 6,745,977 B1 | 6/2004 | Long et al. | |
| 6,883,748 B2 | 4/2005 | Yoeli | |
| 6,892,980 B2 | 5/2005 | Kawai | |
| 7,048,505 B2 | 5/2006 | Segota et al. | |
| 7,118,066 B2 | 10/2006 | Allen | |
| 7,147,182 B1 | 12/2006 | Flanigan | |
| 7,159,817 B2 | 1/2007 | Vandermey et al. | |
| 7,219,013 B1 | 5/2007 | Young et al. | |
| 7,263,630 B2 | 8/2007 | Sailer | |
| 7,310,573 B2 | 12/2007 | Stickling | |
| 7,318,565 B2 | 1/2008 | Page | |
| 7,376,088 B2 | 5/2008 | Gambardella et al. | |
| 7,802,754 B2 | 9/2010 | Karem | |
| 7,822,516 B2 | 10/2010 | Yanaka et al. | |
| 7,857,253 B2 | 12/2010 | Yoeli | |
| 7,857,254 B2 | 12/2010 | Parks | |
| 7,874,513 B1 | 1/2011 | Smith | |
| 7,877,627 B1 | 1/2011 | Freydel | |
| 8,016,226 B1 | 9/2011 | Wood | |
| 8,016,566 B2 | 9/2011 | Agnihotri et al. | |
| 8,056,866 B2 | 11/2011 | De | |
| 8,152,096 B2 | 4/2012 | Smith | |
| 8,275,494 B1 | 9/2012 | Roth | |
| 8,376,264 B1 | 2/2013 | Hong et al. | |
| 8,469,306 B2 | 6/2013 | Kuhn | |
| 8,485,464 B2 | 7/2013 | Kroo | |
| 8,527,233 B2 | 9/2013 | Mcintyre | |
| 8,602,347 B2 | 12/2013 | Isaac et al. | |
| 8,708,273 B2 | 4/2014 | Oliver | |
| 8,733,690 B2 | 5/2014 | Bevirt et al. | |
| 8,800,912 B2 | 8/2014 | Oliver | |
| 8,849,479 B2 | 9/2014 | Walter | |
| 8,998,125 B2 | 4/2015 | Hollimon et al. | |
| 9,046,109 B2 | 6/2015 | Duke et al. | |
| 9,075,144 B1 | 7/2015 | Straub et al. | |
| 9,102,401 B2 | 8/2015 | Collins et al. | |
| 9,128,109 B1 | 9/2015 | Oneill | |
| 9,415,870 B1 * | 8/2016 | Beckman ............... B64C 39/024 | |
| 9,422,055 B1 * | 8/2016 | Beckman ............... B64U 20/40 | |
| 9,435,661 B2 | 9/2016 | Brenner et al. | |
| 9,694,911 B2 | 7/2017 | Bevirt et al. | |
| 9,786,961 B2 | 10/2017 | Dyer et al. | |
| 9,851,723 B2 | 12/2017 | Builta | |
| 9,944,386 B1 | 4/2018 | Reichert et al. | |
| 9,963,228 B2 | 5/2018 | McCullough et al. | |
| 10,046,855 B2 | 8/2018 | Bevirt et al. | |
| 10,144,503 B1 | 12/2018 | Vander Lind et al. | |
| 10,144,504 B1 | 12/2018 | Selwa et al. | |
| 10,183,746 B2 | 1/2019 | McCullough et al. | |
| 10,246,184 B2 | 4/2019 | Ragland | |
| 10,287,011 B2 | 5/2019 | Wolff et al. | |
| 10,364,036 B2 | 7/2019 | Tighe et al. | |
| 10,392,107 B2 | 8/2019 | Har et al. | |
| 10,497,996 B1 | 12/2019 | Muniz et al. | |
| 10,513,334 B2 | 12/2019 | Groninga et al. | |
| 2002/0153452 A1 | 10/2002 | King et al. | |
| 2003/0038213 A1 | 2/2003 | Yoeli | |
| 2003/0062443 A1 | 4/2003 | Wagner et al. | |
| 2003/0080242 A1 | 5/2003 | Kawai | |
| 2003/0085319 A1 | 5/2003 | Wagner et al. | |
| 2003/0094537 A1 | 5/2003 | Austen-Brown | |
| 2003/0106959 A1 | 6/2003 | Fukuyama | |
| 2004/0093130 A1 | 5/2004 | Osder et al. | |

(56) References Cited

U.S. PATENT DOCUMENTS

| | | |
|---|---|---|
| 2004/0126241 A1 | 7/2004 | Zha et al. |
| 2004/0141170 A1 | 7/2004 | Jamieson et al. |
| 2004/0195460 A1 | 10/2004 | Sailer |
| 2004/0245376 A1 | 12/2004 | Muren |
| 2005/0178879 A1 | 8/2005 | Mao |
| 2005/0230524 A1 | 10/2005 | Ishiba |
| 2005/0251328 A1 | 11/2005 | Merwe et al. |
| 2006/0016930 A1 | 1/2006 | Pak |
| 2006/0097103 A1* | 5/2006 | Atmur ............... B64C 17/00 244/7 C |
| 2006/0113426 A1 | 6/2006 | Yoeli |
| 2006/0226281 A1 | 10/2006 | Walton |
| 2007/0036657 A1 | 2/2007 | Wobben |
| 2007/0154314 A1 | 7/2007 | Jarrah et al. |
| 2007/0221779 A1 | 9/2007 | Ikeda |
| 2008/0048065 A1 | 2/2008 | Kuntz |
| 2008/0205416 A1 | 8/2008 | Dechiara |
| 2008/0283673 A1 | 11/2008 | Yoeli |
| 2009/0008499 A1 | 1/2009 | Shaw |
| 2009/0084907 A1 | 4/2009 | Yoeli |
| 2009/0140102 A1 | 6/2009 | Yoeli |
| 2009/0159757 A1 | 6/2009 | Yoeli |
| 2009/0200431 A1 | 8/2009 | Konings et al. |
| 2009/0224095 A1 | 9/2009 | Cox et al. |
| 2009/0283629 A1 | 11/2009 | Kroetsch et al. |
| 2010/0052978 A1 | 3/2010 | Tillotson |
| 2010/0072325 A1 | 3/2010 | Sambell |
| 2010/0076625 A1 | 3/2010 | Yoeli |
| 2010/0100260 A1 | 4/2010 | McIntyre et al. |
| 2010/0193644 A1 | 8/2010 | Karem |
| 2010/0264257 A1 | 10/2010 | Brunken |
| 2010/0270419 A1 | 10/2010 | Yoeli |
| 2010/0270435 A1 | 10/2010 | Karem |
| 2011/0001020 A1 | 1/2011 | Forgac |
| 2011/0024552 A1 | 2/2011 | Patt et al. |
| 2011/0042508 A1 | 2/2011 | Bevirt |
| 2011/0042509 A1 | 2/2011 | Bevirt et al. |
| 2011/0042510 A1 | 2/2011 | Bevirt et al. |
| 2011/0049306 A1 | 3/2011 | Yoeli |
| 2011/0049307 A1 | 3/2011 | Yoeli |
| 2011/0139923 A1 | 6/2011 | Papanikolopoulos et al. |
| 2011/0139939 A1 | 6/2011 | Martin et al. |
| 2011/0147533 A1 | 6/2011 | Goossen et al. |
| 2011/0180656 A1 | 7/2011 | Shue et al. |
| 2011/0284201 A1 | 11/2011 | Soenmez et al. |
| 2011/0303795 A1 | 12/2011 | Oliver |
| 2011/0315809 A1 | 12/2011 | Oliver |
| 2012/0025016 A1* | 2/2012 | Methven ............... B64C 11/00 244/1 N |
| 2012/0061526 A1 | 3/2012 | Brunken |
| 2012/0091257 A1 | 4/2012 | Wolff et al. |
| 2012/0234968 A1 | 9/2012 | Smith |
| 2012/0251326 A1 | 10/2012 | Schimke et al. |
| 2013/0060406 A1 | 3/2013 | Christensen et al. |
| 2013/0132548 A1 | 5/2013 | Cabos |
| 2013/0138413 A1 | 5/2013 | Finch et al. |
| 2013/0164578 A1 | 6/2013 | Sweet et al. |
| 2013/0201316 A1 | 8/2013 | Binder et al. |
| 2013/0204544 A1 | 8/2013 | Thomas |
| 2014/0046510 A1 | 2/2014 | Randolph et al. |
| 2014/0138492 A1 | 5/2014 | Van Staagen |
| 2014/0299708 A1 | 10/2014 | Green et al. |
| 2014/0339372 A1 | 11/2014 | Dekel et al. |
| 2014/0358333 A1 | 12/2014 | White et al. |
| 2015/0012154 A1 | 1/2015 | Senkel et al. |
| 2015/0056058 A1 | 2/2015 | Grissom et al. |
| 2015/0102659 A1 | 4/2015 | Liffring et al. |
| 2015/0136897 A1 | 5/2015 | Seibel et al. |
| 2015/0147181 A1* | 5/2015 | Henze ............... B64C 11/18 416/215 |
| 2015/0232178 A1 | 8/2015 | Reiter |
| 2015/0266571 A1 | 9/2015 | Bevirt et al. |
| 2015/0360794 A1 | 12/2015 | Certain et al. |
| 2016/0026190 A1 | 1/2016 | Kowalski et al. |
| 2016/0031555 A1 | 2/2016 | Bevirt et al. |
| 2016/0031556 A1 | 2/2016 | Bevirt et al. |
| 2016/0083073 A1 | 3/2016 | Beckman |
| 2016/0112151 A1 | 4/2016 | Chedas et al. |
| 2016/0144957 A1 | 5/2016 | Claridge et al. |
| 2016/0204488 A1 | 7/2016 | Arai et al. |
| 2016/0209290 A1 | 7/2016 | Shue |
| 2016/0265556 A1 | 9/2016 | Stadler et al. |
| 2016/0272312 A1 | 9/2016 | Mallard |
| 2016/0294882 A1 | 10/2016 | Michaels |
| 2016/0304194 A1 | 10/2016 | Bevirt et al. |
| 2017/0036753 A1 | 2/2017 | Shue |
| 2017/0101176 A1 | 4/2017 | Alber et al. |
| 2017/0104385 A1 | 4/2017 | Salamon et al. |
| 2017/0131716 A1 | 5/2017 | Brekke et al. |
| 2017/0217584 A1 | 8/2017 | Elfeky et al. |
| 2017/0267371 A1 | 9/2017 | Frolov et al. |
| 2017/0274983 A1* | 9/2017 | Beckman ............... B64C 11/50 |
| 2017/0277152 A1 | 9/2017 | Liu et al. |
| 2017/0297431 A1 | 10/2017 | Epstein et al. |
| 2018/0001994 A1 | 1/2018 | Morrison |
| 2018/0002016 A1 | 1/2018 | McCullough et al. |
| 2018/0105279 A1 | 4/2018 | Tighe et al. |
| 2018/0115029 A1 | 4/2018 | Ren et al. |
| 2018/0162526 A1* | 6/2018 | Parham, Jr. ............. B64C 27/51 |
| 2018/0237148 A1 | 8/2018 | Hehn et al. |
| 2018/0244370 A1 | 8/2018 | Lombard |
| 2018/0251226 A1 | 9/2018 | Fenny et al. |
| 2018/0290736 A1 | 10/2018 | Mikic et al. |
| 2018/0319491 A1* | 11/2018 | Kearney-Fischer ........ B64C 39/024 |
| 2018/0354615 A1 | 12/2018 | Groninga et al. |
| 2018/0356439 A1 | 12/2018 | Luo et al. |
| 2018/0358664 A1 | 12/2018 | Zhang et al. |
| 2019/0144109 A1 | 5/2019 | Ewing et al. |
| 2019/0210740 A1 | 7/2019 | Luo |
| 2019/0214161 A1 | 7/2019 | Chen et al. |
| 2019/0315471 A1 | 10/2019 | Moore et al. |
| 2019/0341659 A1 | 11/2019 | Terwilliger |
| 2020/0001995 A1 | 1/2020 | Yang et al. |
| 2020/0142431 A1 | 5/2020 | Mehl et al. |
| 2020/0148347 A1 | 5/2020 | Bevirt et al. |

FOREIGN PATENT DOCUMENTS

| | | | |
|---|---|---|---|
| CN | 107042884 A | 8/2017 | |
| DE | 102012104783 A1 | 12/2013 | |
| EP | 0945841 A1 | 9/1999 | |
| EP | 3366583 A1 | 8/2018 | |
| EP | 3401216 A1 | 11/2018 | |
| GB | 1271102 A | 4/1972 | |
| WO | 03074924 A1 | 9/2003 | |
| WO | 03086857 A1 | 10/2003 | |
| WO | WO-2010096104 A1 * | 8/2010 | ............. B64C 19/00 |
| WO | 2019001203 A1 | 1/2019 | |
| WO | 2019056053 A1 | 3/2019 | |

OTHER PUBLICATIONS

Sullivan et al. "A Subjective Test of Modulated Blade Spacing for Helicopter Main Rotors" (Year: 2002).*
English Translation of Description CH677844A5 (Year: 1989).*
European Search Report for Application No. 15765064.9 dated Oct. 16, 2017.
International Search Report and Written Opinion for Application No. PCT/US10/46500 dated Apr. 13, 2011.
International Search Report and Written Opinion for Application No. PCT/US15/21344 dated Sep. 11, 2015.
International Search Report and Written Opinion for Application No. PCT/US15/21350 dated Sep. 15, 2015.
International Search Report and Written Opinion for Application No. PCT/US2017/059809 dated Jul. 31, 2018.
International Search Report and Written Opinion for PCT Application No. PCT/US2019/039247 mailed Sep. 13, 2019.
International Search Report and Written Opinion for PCT Application No. PCT/US2019035236 mailed Aug. 20, 2019.
International Search Report and Written Opinion of the ISA for Application No. PCT/US2019/065293 dated Feb. 11, 2020.

(56) References Cited

OTHER PUBLICATIONS

"Ailerons", NASA student page, 3 pages, Nov. 1, 2018, downloaded from: https://www.grc.nasa.gov/ww/k-12/airplane/alr.hltm.
"Airfolds Blade Profile", Mecaflux Heliciel, Propeller & Wing, https://www.heliciel.com/en/aerodynamique-hydrodynamique/profils%20aile%20profil%20pale.htm.
"Curtiss-Wright X-19", Wikipedia, https://en.wikipedia.org/wiki/Curtiss-Wright_X-19.
"Inclined Flat Plate", Aerodynamics of the airplane, Feb. 13, 2016.
International Search Report and Written Opinion of the ISA dated Dec. 4, 2019 for PCT/US19/51565.
International Search Report and Written Opinion of the ISA dated Mar. 19, 2020 for PCT/US19/67618.
International Search Report and Written Opinion of the ISA, dated Jul. 24, 2019, for application No. PCT/US19/31863.
Berger, Tom, "Handling Qualities Requirements and Control Design for High-Speed Rotorcraft", Special Report FCDD-AMV-20-01, Feb. 2020, Combat Capabilities Devcom Aviation and Missile Center, U.S. Army, 360 pages.
Carson, Biz, "First Look: Uber Unveils New Design for Uber Eats Delivery Drone", https:www.forbes.com/sites/bizcarson/2019/10/28/first-look-uber-unveils-new-design-for-uber-eats-delivery-drone/#1703f8d778f2.
Denham, Jr., James W., et al., "Converging on a Precision Hover Control Strategy for the F35B Stovl Aircraft", AIAA Guidance, Navigation and Control Conference and Exhibit Aug. 18-21, 2006, Honolulu, Hawaii, Abstract only.
Falco, Gianluca, et al., "Loose and Tight GNSS/INS Integrations: Comparison of Performance Assessed in Real Urban Scenarios", Sensors (Basel) Feb. 2017; 17 (2): 225, https://www.ncbi.nlm.nih.gov/pmc/articles/PMC5335985/.
Gold, Phillip J., et al., "Design and Pilot Evaluation of the RAH-66 Comanche Selectable Control Modes", https://ntrs.nasa.gov/search.jsp?, N94-13322, pp. 419-431, Jul. 1, 1993.
Kang, Youngshin, et al., "Development of flight control system and troubleshooting on flight test of a tilt-rotor unmanned aerial vehicle", International Journal of Aeronautical and Space Sciences (IJASS), vol. 17 No. 1, 2016, pp. 120-131.
Kim, Tae, "Reduction of Tonal Propeller Noise by Means of Uneven Blade Spacing", University of California, Irvine, Thesis, publication date 2016.
Radhakrishnan, Anand, et al., "An Experimental Investigation of a Quad Tilt Rotor in Ground Effect", 21st Applied Aerodynamics Conference, Jun. 23-26, 2003, Orlando, Florida, AIAA 2003-3517, 11 pages.
Saraf, A. Amit Kumar, et al., "Study of Flow Separation on Airfoil with Bump", International Journal of Applied Engineering Research ISSN 09773-4562, vol. 13, No. 16 (2018), pp. 128686-12872.
Sullivan, Brenda M., et al., "A Subject Test of Modulated Blade Spacing for Helicopter Main Rotors", Presented at the American Helicopter Society 58th Annual Forum, Montreal, Canada, Jun. 11-13, 2002, http://ntrs.nasa.gov/search.isp.
Thorsen, Adam T., "Development of Evaluation of a Unified Control Architecture for a Compound Rotorcraft in Maneuvering Flight", AIAA Aviation Forum, AIAA Atmospheric Flight Mechanics Conference, Jun. 13-17, 2016, Washington, D.C., AIAA Paper 10.2514/6.2016-3392, 19 pages.
Vigano, Luca, et al., "Development of Augmented Control Laws for a Tiltrotor in Low and High Speed Flight Modes", 43rd European Rotorcraft Forum Proceedings, Sep. 12-15, 2017, Milan, Italy, vol. 1, pp. 438 to 451.
Walker, Gregory, et al., "F-35B integrated flight-propulsion control development", AIAA Aviation Forum, 2013 International Powered Lift Conference, Aug. 12-14, 2013, Los Angeles, CA, AIA Paper 10.2514/6.2013-4243, 16 pages.
Whittle, Richard, "Flying the Osprey is not dangerous, just different: Veteran pilots", Breaking Defense, Sep. 5, 2012, 9 pages, downloaded from: https://breakingdefense.com/2012/09/flying-the-osprey-is-not-dangerous-iust-different-veteran-pilo/.
Yeh, Y.C. (BOB), "Triple-Triple Redundant 777 Primary Flight Computer", 1996, IEEE, pp. 293-307 (Year: 1996).
Young, Larry A., "Conceptual Design Aspects of Three General Sub-Classes of Multi-Rotor Configurations: Distributed, Modular, and Hetergenerous", NASA Ames Research Center, Moffett Field, CA 94035, Published 2015, Computer Science.

* cited by examiner

SYSTEM AND METHOD FOR AIRCRAFT NOISE MITIGATION

CROSS-REFERENCE TO RELATED APPLICATIONS

This application is a Divisional Application of U.S. application Ser. No. 16/430,163, filed 3 Jun. 2019, which claims the benefit of U.S. Provisional Application Ser. No. 62/679,411, filed 1 Jun. 2018, both of which are incorporated herein in their entirety by this reference.

TECHNICAL FIELD

This invention relates generally to the aircraft field, and more specifically to a new and useful system and method for noise mitigation in the aircraft field.

BACKGROUND

Aircraft inherently produce audible noise. Rotorcraft in particular, and any other propeller- or rotor-driven aircraft or aircraft driven by a rotary aerodynamic actuator, can emit substantial amounts of acoustic noise. Typical such aircraft include at least one propeller (or rotor) that can generate audible acoustic signatures at rotation frequency, the blade pass frequency (BPF), and harmonics thereof, which can be shifted by changing the revolutions per minute (RPM) of the propeller. However, typical such aircraft are often unable to operate properly across a wide range of propeller RPMs due to the restrictive nature of internal-combustion-based mechanical power generation and transfer. Furthermore, many conventional rotorcraft rely on a small number (e.g., one, two, etc.) of propellers and/or rely exclusively upon propellers to provide lift to the aircraft, which can limit the flexibility to adjust propeller parameters to achieve desired acoustic signatures without adversely affecting flight performance. Acoustic signatures such as these can also carry a psychoacoustic penalty, wherein the high degree of tonality and/or other characteristics of the acoustic signature can cause negative psychological and/or physiological perceptions of the acoustic signature by individuals in audible range of the propulsion mechanisms of the aircraft.

Thus, there is a need in the aircraft field to create a new and useful system and method for aircraft noise mitigation. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview

Figure 1:
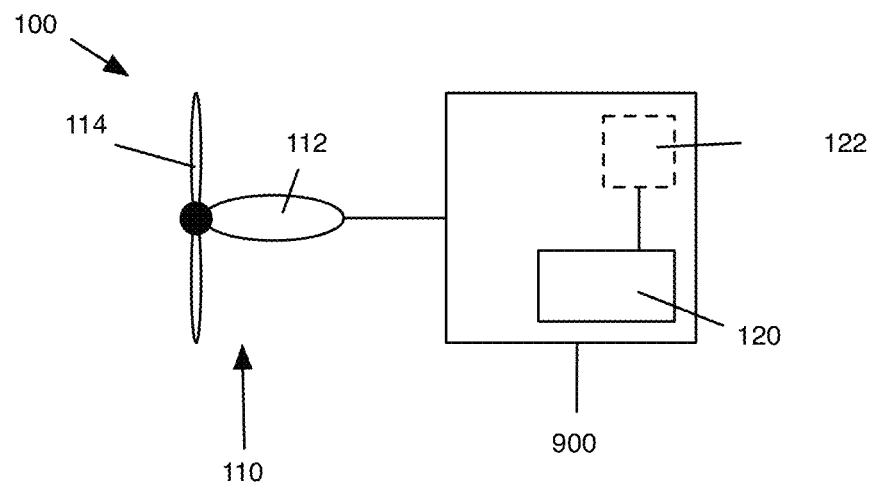
FIG. 1 depicts a variation of the system for aircraft noise mitigation.

As shown in FIG. 1, the system 100 for noise mitigation includes a propulsion assembly 110 arranged on an aircraft 900. The system 100 preferably includes a plurality of propulsion assemblies 110; however, the system can alternatively include a single propulsion assembly no. The system 100 can also include: a control subsystem 120 that can include acoustic sensors 122 (e.g., microphones, piezo-transducers, etc.), and any other suitable components. A propulsion assembly (e.g., a single propulsion assembly, a propulsion assembly of the plurality of propulsion assemblies, etc.) includes a motor 112 and at least a first propeller 114.

The system 100 functions to mitigate the effects of noise by reducing a psychoacoustic penalty of the sound emitted by the aircraft (e.g., rotorcraft, rotary-wing aircraft, tiltrotor aircraft, tilt-prop aircraft, propeller-driven aircraft, etc.) during operation. The psychoacoustic penalty of the sound can be related to the shape of the frequency spectrum of the emitted sound (e.g., the distribution of acoustic power across the frequency range of the emitted acoustic signature) in relation to the human perception of sound across the frequency range of human hearing, the tonality of the frequency spectrum (e.g., the concentration of acoustic power at the blade pass frequency and integer or fractional multiples thereof), and any other characteristic of the emitted sound related to a listener's experience of the emitted sound. A large psychoacoustic penalty can be associated with a large negative reaction of a listener to the emitted sound (e.g., wherein the listener perceives the sound as unpleasant), whereas a small psychoacoustic penalty (or a reduction in the psychoacoustic penalty) can be associated with a small negative reaction and/or a positive reaction of a listener to the emitted sound (e.g., wherein the listener perceives the sound as not-unpleasant or pleasant). However, the psychoacoustic penalty can be otherwise suitably defined. The system can also additionally or alternatively function to: spread the acoustic frequency spectrum of the emitted sound; shift the acoustic frequency spectrum of the emitted sound; reduce the total acoustic power of the emitted sound (e.g., dampen the emitted sound); dynamically adjust the acoustic frequency spectrum of the emitted sound; otherwise suitably mitigate the noise generated by an aircraft (e.g., rotorcraft); and/or perform any other suitable function.

The system can be operated between a plurality of operating modes, including a position-controlled mode, a variable-RPM mode, a phase-controlled mode, and a spread-RPM mode. In the position-controlled mode, azimuthal position of the propeller is actively controlled (e.g., by a computing system communicatively coupled to the motor) in an absolute sense; in the phase-controlled mode, the azimuthal position of each propeller is controlled relative to the azimuthal position of each other propeller of a plurality of propellers (e.g., of a plurality of propulsion assemblies). In the variable-RPM mode, the RPM of the propeller is actively controlled; in the spread-RPM mode, the variation in RPM of each of the simultaneously-operated propellers (e.g., of the plurality of propulsion assemblies) is actively controlled.

In some variations, the system can be simultaneously operable in the spread-RPM and phase-controlled modes; likewise, in further variations, the system can be simultaneously operable in the variable-RPM and position-controlled modes. However, the system can be otherwise suitably operated between any other suitable operating modes and/or combinations thereof.

The aircraft 900 is preferably a rotorcraft, and more preferably a tiltrotor aircraft with a plurality of propulsion assemblies, operable between a forward arrangement and a hover arrangement. However, the aircraft can alternatively be a fixed wing aircraft with one or more propulsion assemblies, a helicopter with one or more propulsion assemblies, and/or any other suitable aircraft or vehicle propelled by propellers. The rotorcraft preferably includes an all-electric powertrain (e.g., battery powered electric motors) to drive the one or more propulsion assemblies, but can additionally or alternatively include a hybrid powertrain (e.g., a gas-electric hybrid including an internal-combustion generator), an internal-combustion powertrain (e.g., including a gas-turbine engine, a turboprop engine, etc.), and any other suitable powertrain.

In alternative variations, the aircraft 900 can include any suitable aerial vehicle having a rotary and/or distributed propulsion system, wherein the acoustic signature(s) arise from rotating aerodynamic actuators (e.g., turbofan components, turbojet components, turbines, propellers, etc.) or a plurality thereof (e.g., distributed about the aircraft, proximally located at the aircraft, etc.).

The term "rotor" as utilized herein can refer to a rotor, a propeller, and/or any other suitable rotary aerodynamic actuator (e.g., main propulsion unit of a rotary wing aircraft, auxiliary propulsion unit of a rotary wing aircraft, propulsion element of a fixed or tilt-wing aircraft, thrust-providing element of any aircraft type, etc.). While a propeller can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of propeller can refer to either configuration, and any other possible configuration of articulated or rigid blades, and/or any other possible configuration of blade connections to a central member or hub. Accordingly, the tiltrotor aircraft can be referred to as a tilt-propeller aircraft, a tilt-prop aircraft, and/or otherwise suitably referred to or described.

Figure 2:
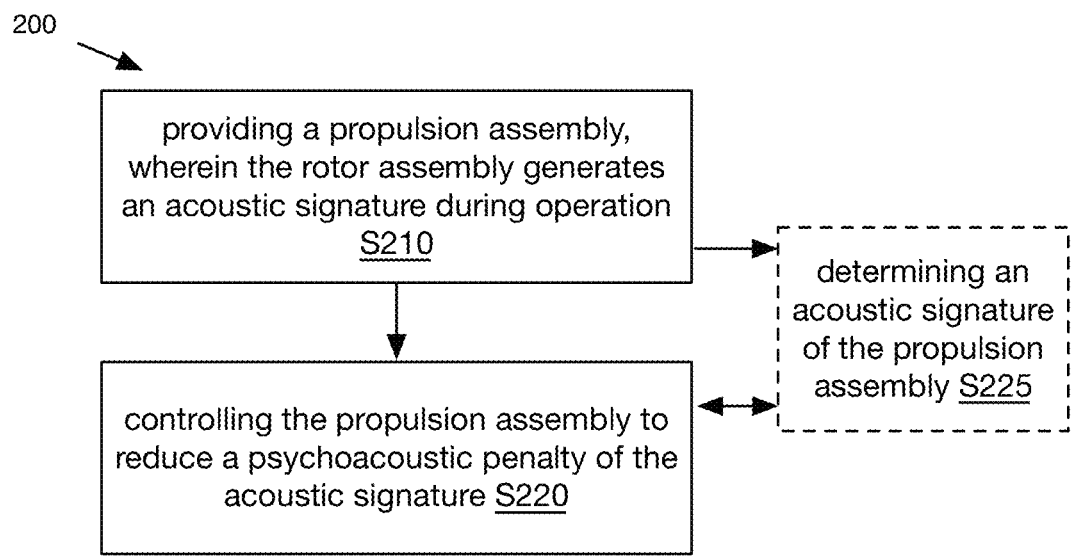
FIG. 2 depicts a variation of the method for aircraft noise mitigation.

As shown in FIG. 2, the method 200 can include: providing a propulsion assembly, wherein the propulsion assembly generates an acoustic signature during operation S210; and controlling the propulsion assembly (and/or propulsion assemblies) to reduce a psychoacoustic penalty of the acoustic signature S220. Block S210 preferably includes providing a plurality of propulsion assemblies, and Block S220 preferably includes controlling the plurality of propulsion assemblies; however, Blocks S210 and S220 can additionally or alternatively include providing and controlling a single propulsion assembly, respectively. The method 200 can optionally include: determining an acoustic signature (e.g., acoustic signature data) of the propulsion assembly (and/or propulsion assemblies) S225; and/or any other suitable processes and/or blocks.

The method 200 functions to reduce a psychoacoustic penalty of the sound emitted by the aircraft during operation. The psychoacoustic penalty is preferably defined substantially as described above; however, the psychoacoustic penalty can additionally or alternatively be otherwise suitably defined. The method can additionally or alternatively function to: spread out the acoustic power of the emitted sound across the acoustic frequency spectrum; shift the acoustic frequency spectrum of the emitted sound; reduce the total acoustic power of the emitted sound; dynamically adjust the frequency spectrum of the emitted sound; and/or perform any other suitable function.

The method is preferably implemented by a system substantially as described above and in Section 3 below (e.g., the system 100); however, the method can additionally or alternatively be implemented by any other suitable system. The method can be implemented in conjunction with various related systems, such as: a communication system (e.g., a land-based communication system, a space-based communication system, an aerial communication system, any combination of the aforementioned communication systems, etc.), an acoustic characterization system (e.g., a network of acoustic sensors arranged at the aircraft and/or at ground positions), and any other suitable systems.

2. Benefits

The system and method and variations thereof can afford several benefits and/or advantages.

First, variants of the system and method can reduce the tonality of the acoustic spectrum emitted by the aircraft during operation. The tonality of the spectrum (e.g., the degree to which acoustic power is concentrated at the base frequency and its harmonics, the opposite of the amount of frequency spreading, etc.) can carry a psychoacoustic penalty, wherein the noise generated by the aircraft is perceived (e.g., by a passenger, by an observer on the ground, etc.) to be louder and/or more noticeable (e.g., harsher, tinnier, more irritating, etc.) than a less-tonal acoustic spectrum of equivalent total acoustic power. By spreading the peaks in the frequency signature using one or more of asymmetric blade spacing, RPM-spreading, position-control, phase-shifting, and the like, variants of the system and method can reduce the tonality of the spectrum.

Second, variants of the system and method can enable a wide range of rpm values to be used in providing thrust to the aircraft using the plurality of propellers, which can enhance the ability to spread the acoustic spectrum emitted by the aircraft. For example, the aircraft can include electrically powered propellers (e.g., propulsion assemblies including electric drive motors) that include a substantially flat torque curve, which can enable the propellers to be driven at a wide RPM range without sacrificing drive torque (e.g., as compared to an internal-combustion engine and mechanical power transmission in a conventional aircraft). The aircraft can additionally or alternatively include variable-pitch propeller blades, such that the propeller can provide a substantially equivalent thrust at a range of RPM values by varying the pitch of the propeller blades (e.g., to correspond to a given rpm for a desired thrust value). In another example, the aircraft includes at least three propulsion assemblies, and thrust and/or RPM can be distributed amongst them based on overall thrust and moment constraints (e.g., in a hover configuration or arrangement). In another related example, the thrust and/or RPM can be distributed amongst the plurality of propulsion assemblies based on an overall thrust constraint (e.g., in a forward-flight configuration or arrangement) wherein moment constraints can be otherwise satisfied (e.g., using other effectors of the aircraft aside from the propulsion assemblies).

Third, variants of the system and method can enable dynamic acoustic frequency spreading in substantially real-time. For example, the system can include a frequency-spreading propeller controller that adjusts the frequency spread of the plurality of propulsion assemblies during operation in response to a measured acoustic signature at an interior vehicle location (e.g., measured via an onboard microphone). In another example, the method can include dynamically adjusting the relative azimuthal position of the blades of one or more propellers based on a control input (e.g., received from a pilot) indicating a desired acoustic response.

Fourth, variants of the system and method can enable static acoustic frequency spreading using predetermined ranges of RPM values (e.g., wherein each distribution of RPM values for each propeller is associated with a control input and corresponding thrust distribution across the propulsion assemblies or thrust value of a single propulsion assembly), asymmetric blade spacings (e.g., of a single propeller, of a single main propeller, of a plurality of propellers, etc.), and/or blade numbers across the plurality of propellers. Static acoustic frequency spreading can be fixed (e.g., predetermined) at each operating condition of the aircraft, in contrast with dynamic acoustic frequency spreading that can be dynamically adjusted (e.g., based on closed loop feedback control including an acoustic sensor, based on the operating condition of the aircraft, etc.) during aircraft operation.

Fifth, variants of the system and method can enable precise propeller control via direct drive (e.g., wherein the motor is directly coupled to the propeller of the propulsion assembly). For example, the position of the propeller (e.g., the azimuthal position, etc.) can be rigidly coupled to the rotating portion of the motor (e.g., the propeller of an electric motor of the motor) such that the propeller azimuthal position and the azimuthal position of the rotating portion of the motor are synchronized, and the controllability of the propeller azimuthal position and/or phase (e.g., relative azimuthal position compared to other propellers during rotation) is equivalent to the controllability of the motor (e.g., in contrast to an indirect motor including a transmission, or other decouplable or variable power transmission linkage).

However, the tiltrotor aircraft and variations thereof can additionally or alternatively afford any other suitable benefits and/or advantages.

3. System

As shown in FIG. 1, the system 100 for noise mitigation includes a propulsion assembly no arranged on an aircraft (e.g., integrated with the aircraft). The system 100 preferably includes a plurality of propulsion assemblies 110; however, the system can alternatively include a single propulsion assembly. The system 100 can also include acoustic sensors (e.g., microphones). A propulsion assembly (e.g., the single propulsion assembly, a propulsion assembly of the plurality of propulsion assemblies, etc.) includes a propeller 114 and a motor 112. The system can additionally or alternatively include any other components suitable for an aircraft.

3.1 Propulsion Assembly

The propulsion assembly 110 includes a motor 112 and a propeller 114. The propulsion assembly 110 functions to provide propulsion to the aircraft. The propulsion assembly no can, in variations of the system implemented in conjunction with a tiltrotor aircraft, include a tilt mechanism. In variations including a tilt mechanism, the propulsion assembly 110 can function to provide vertical and horizontal thrust capability to the aircraft.

The system preferably includes a plurality of propulsion assemblies 110 and a corresponding plurality of propellers 114 and motors 112, wherein each of the plurality of propulsion assemblies no provides thrust to the aircraft. However, the system can additionally or alternatively include a single propulsion assembly 110, and/or a plurality of propulsion assemblies 110 wherein a subset of the plurality does not provide propulsive thrust to the aircraft (e.g., wherein the subset of the plurality provides primarily stabilizing force to the aircraft, as in the case of a tail rotor). In further alternative variations, the system can include any suitable number of propulsion assemblies no.

The system can be operated between a plurality of operating modes, including a position-controlled mode, a variable-RPM mode, a phase-controlled mode, and a spread-RPM mode.

The motor 112 is preferably a direct-motor 112 (e.g., a direct-drive electric motor 112, a powerplant omitting a variable gearbox or other indirect power transfer mechanism, a constantly-geared motor 112, etc.) that is operable at a range of RPM values (e.g., 100-1000 rpm, 550-850 rpm, 625-675 rpm, etc.) at a high efficiency (e.g., propulsive efficiency, ratio between shaft output power and electric input power, etc.) across the range of RPM values. The high efficiency of the motor 112 (e.g., of the electric motor) at a wide range of RPM values and its ability to produce ample shaft power (e.g., sufficient shaft power for a desired operating condition) at a wide range of RPM values can facilitate practical operation of the propulsion assembly 110 (e.g., operation of the propulsion assembly 110 to provide the desired thrust without excessive power consumption) over the wide range of RPM values (e.g., without being power-limited or limited by the availability of onboard power, without limitation by other factors that can render operation impractical, etc.). In some variations, the motor 112 can be configured to produce a high torque at low RPM values (e.g., wherein the motor 112 defines a substantially flat torque curve, wherein the motor 112 defines any other suitable torque curve, etc.), which can enable operation of the propulsion assembly 110 in a high power and low RPM regime (e.g., which can reduce noise). However, the motor 112 can be otherwise suitably configured to produce any suitable output torque as a function of RPM value such that the output power requirement (e.g., determined by the desired operating condition) is met at any RPM within the operating range (e.g., any suitable range of RPM values). In additional or alternative variations, the motor 112 can be configured to enable precise control of the azimuthal position of the propeller 114 (e.g., of each propeller 114 of a plurality of rotors). The direct-drive characteristic of the motor 112 can enable the azimuthal position of the propeller 114 to be controlled to the same degree that the rotating output of the motor 112 can be controlled; for example, a motor 112 including a stepper motor 112 can control the azimuthal position of the propeller 114 (and, in variations including a plurality of propellers 114, the phase of the propeller 114 relative to other propellers 114 of the plurality) to within one step of the stepper motor 112. The torque curve of the motor 112 can enable the RPM to be precisely controlled without unduly sacrificing other performance characteristics (e.g., motor 112 operating efficiency, propulsive efficiency, aerodynamic efficiency, power output, torque output, etc.), and can particularly enable such precise control when utilized in conjunction with variable pitch blades (e.g., such that thrust can be held constant for variable RPM while the blades are not in a stall condition).

In the position-controlled mode, the azimuthal position of the propeller 114 is preferably controlled (e.g., by the control subsystem 120) based on the acoustic emission of the rotor; for example, the azimuthal position of the propeller 114 can be modulated in order to achieve a desired frequency spectrum. Azimuthal position modulation can include maintaining a constant rotation rate as a function of time (e.g., constant frequency of rotation), modulating the instantaneous frequency about a base frequency at any suitable modulation frequency (e.g., within a single rotation period), and/or otherwise suitable controlling the azimuthal position of the propeller 114. However, the position-controlled mode can additionally or alternatively include propeller 114 operation in any suitable manner.

In the variable-RPM mode, the RPM is preferably precisely controlled between a range of RPM values based on the acoustic emission of the propeller 114, and more preferably controlled independently of the thrust generated by the rotor; for example, the blade pitch can be increased (e.g., while minimizing and/or avoiding a stall condition along the blade span) and the RPM value decreased in order to lower the fundamental frequency (e.g., the frequency of full rotation of one blade of the rotor) and associated harmonics of the emitted acoustic signature while retaining a substantially equivalent thrust. In the variable-RPM mode, and for a given diameter of the propeller 114, the propeller 114 is preferably operated in the low tip speed regime; however, the propeller 114 can additionally or alternatively be operated in a high tip speed regime and/or any other suitable range of tip speeds. In a specific example, the low-tip speed regime and the propeller 114 diameter correspond to about 650 RPM ±about 50 RPM in a hover mode or hover arrangement of the aircraft, and less than 650 RPM in a forward mode or forward arrangement of the aircraft. However, the variable-RPM mode can additionally or alternatively include operation of the propeller 114 in any suitable manner.

In variations of the system including a plurality of propulsion assemblies 110, the plurality of operating modes can include a spread-RPM mode and a phase-controlled mode. In the spread-RPM mode, each propeller 114 is preferably driven by its corresponding motor 112 at a unique RPM (e.g., relative to each other propeller 114 of the plurality of rotors); however, the spread RPM mode can additionally or alternatively include operation of a single propeller 114 of the plurality at a different RPM than an RPM at which each of the other propellers 114 of the plurality is operated (e.g., wherein only a single propeller 114 of the plurality is operated at a distinct RPM from the remainder of the rotors), operation of a subset of the plurality at a first RPM and another subset of the plurality at a second RPM, and/or any other suitable correspondence of RPM values to propellers 114 of the plurality of propulsion assemblies no.

In the phase-controlled mode, the phase of each propeller 114 (e.g., the difference in angular position between the propeller 114 and any other suitable propeller 114 of the aircraft rotating at substantially the same RPM value) is preferably actively (e.g., automatically) controlled relative to each other propeller 114 in substantially the same manner as described in relation to the position-controlled mode, suitably extended to the operation of the plurality of propellers 114. In some variations, the phase of each propeller 114 can be controlled to be different from the phase of each other propeller 114 during operation (e.g., wherein the phases of all but one propeller 114 are nonzero, wherein the phase of at least one propeller 114 is nonzero, etc.). In further variations, the phase of one or more propellers 114 can be controlled such that the acoustic signatures of one or more propellers 114 destructively interfere at a predetermined location relative to the one or more propellers 114. For example, the phase of two propellers 114 arranged equidistant to a point in space can be controlled to have complimentary phases, such that the acoustic signatures of the two propellers 114 cancel at the point in space. The point in space in the aforementioned example and related examples can be within a cabin of the aircraft, on the ground or in a ground structure remote from the aircraft, However, in alternative variations of the phase-controlled mode, any suitable number of propellers 114 can be controlled to have any suitable relative phase (e.g., relative to each other rotor) during operation. In some variations, the system can be simultaneously operable in the spread-RPM and phase-controlled modes.

3.1.1 Propeller

The propeller 114 of the propulsion assembly 110 functions to provide propulsive force to the aircraft. The propeller 114 can also function, as a result of providing the propulsive force to the aircraft, to generate an acoustic signature (e.g., a portion of a total acoustic signature in the case of aircraft including a plurality of propulsion assemblies 110 and/or a propulsion assembly 110 including a plurality of propellers 114). The propeller 114 can define a propeller 114 disc, which can include the swept area and/or swept volume of the propeller 114 during rotation. The propeller 114 can also define a diameter of any suitable value, and any other suitable geometric parameters (e.g., thickness, depth, shape, etc.). The acoustic signature generated by the propeller 114 can include contributions (e.g., to the acoustic power spectrum) from: the propeller 114 blades at the fundamental frequency (e.g., the frequency of a single rotation of one blade of the propeller 114 at a given RPM); the blade pass frequency (BPF) which can be based on the number of propeller 114 blades and the RPM at which the propeller 114 is rotated and is well-defined for a propeller 114 that includes evenly-spaced blades; harmonics of the fundamental frequency (e.g., integer multiples of the fundamental frequency); and at harmonics of the BPF (e.g., 2×BPF, 3×BPF, any integer multiple of the BPF, etc.). The acoustic signature can also include contributions from vibrational modes of the propeller 114 (e.g., precession of the propeller 114, vibration of the blades of the propeller 114, out-of-plane vibration of the disc of the propeller 114, etc.). The acoustic signature can also include contributions from blade vortex interactions (BVI), and from any other suitable sources of noise associated with propeller 114 operation.

The propeller 114 can have any suitable number of blades; the propeller 114 preferably has five blades, but can alternatively have three blades, four blades, six blades, and any other suitable number of blades. The blades can be rigidly fixed to a hub, fixed to a hub and include variable pitch capability (e.g., by way of a suitable variable pitch linkage, cyclic pitch control, etc.), and/or connected to a hub or propeller 114 head by one or more hinges (e.g., a drag hinge, a flap hinge, etc.) to enable blades to lead, lag, and/or flap relative to the hub or propeller 114 head during rotation of the propeller 114 under aerodynamic loading. However, the blades can be otherwise suitably coupled to one another and/or otherwise suitably mechanically linked to form at least a portion of the propeller 114.

The propeller 114 blades are preferably unconstrained (e.g., unenclosed) at the blade tips (e.g., by any sort of mechanical structure), but the propeller 114 can additionally or alternatively include a fairing that encloses the blade tips (e.g., such as the duct of a ducted fan). In such variations, the fairing can function to dampen the acoustic signature components (e.g., acoustic waves) that originate from the blade tips during rotation. However, the propeller 114 blades can additionally or alternatively be constrained or unconstrained in any suitable manner.

In variations of the system including a plurality of propulsion assemblies 110, each propeller 114 preferably includes the same number of blades. However, in alternative variations, different propellers 114 of the plurality can include different numbers of blades, which can function to spread the acoustic spectrum (e.g., due to different blade numbers corresponding to different BPFs and associated harmonics). In a first specific example, the system includes an even number of propulsion assemblies 110 (e.g., six), and each pair of the even number of propulsion assemblies 110 includes a different number of blades from each other pair (e.g., a set of six propulsion assemblies 110 includes two propellers 114 having three blades, two propellers 114 having four blades, and two propellers 114 having five blades), in order to spread the acoustic power within the overall acoustic spectrum away from peaks corresponding to a single BPF (and associated harmonics) to a set of BPFs (and associated harmonics), each BPF corresponding to a pair of propellers 114. However, in further examples, the system can include any suitable number of propulsion assemblies 110 wherein each propulsion assembly 110 includes a propeller 114 having any suitable number of blades (e.g., in order to generate a suitably spread acoustic).

In relation to the blades of the propeller 114, the blades can be asymmetrically spaced. The spacing between each blade (e.g., the inter-blade spacing) can be modulated in various ways in order to reduce the tonality (e.g., and thereby the psychoacoustic penalty) of the acoustic spectrum generated by the propeller 114 during operation (e.g., during rotation). The inter-blade spacing can be randomly modulated, modulated according to computational predictions based on a propeller 114 model or blade model (e.g., of acoustic power generation as a function of RPM), and/or otherwise suitably modulated.

The spacing can be randomly modulated under constraints on modulation magnitude; for example, the maximum variation from the symmetric spacing angle (e.g., 120° for a three bladed propeller 114, 90° for a four bladed propeller 114, 72° for a five bladed propeller 114, 60° for a six bladed propeller 114, etc.) can be constrained to a maximum value (e.g., of 5°, of 2°, of 10°, etc.) and the modulation can be randomly generated (e.g., pseudo-randomly generated, generated by a stochastic process, etc.). In another example of constrained randomized modulation, the variation from the symmetric spacing angle can be constrained to a root-mean-squared (RMS) value (e.g., of 5°, of 2°, of 10°, etc.) from the symmetric spacing angle. However, the inter-blade spacing can alternatively be randomly modulated in an unconstrained manner, and/or modulated under alternative constraints (e.g., maximum disc loading asymmetry constraints, maximum propeller 114 shaft loading constraints, etc.).

Figure 3:
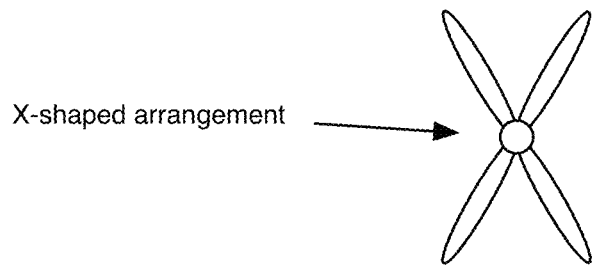
FIG. 3 depicts a first example of an asymmetric propeller blade spacing including symmetrically-paired asymmetric spacings.
Figure 4:
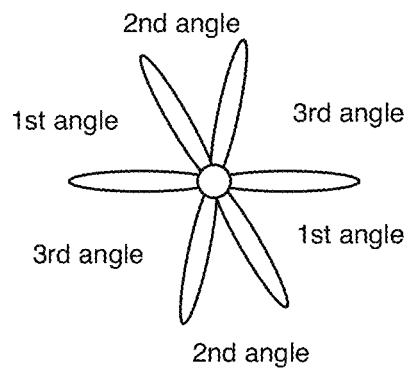
FIG. 4 depicts a second example of an asymmetric propeller blade spacing including symmetrically-paired asymmetric spacings.

In some variations, the asymmetric blade spacing can include symmetrically-paired asymmetric spacings, for propellers 114 including an even number of blades greater than two. For example, as shown in FIG. 3, a four-bladed propeller 114 having asymmetric blade spacing can define an X-shaped arrangement, wherein the inter-blade azimuthal spacing (e.g., interblade angle) alternates between a first acute angle, a first obtuse angle, the first acute angle, and the first obtuse angle. In another example of symmetrically-paired asymmetric spacing, a six-bladed propeller 114 can define an arrangement where the inter-blade azimuthal spacing alternates between a first acute angle (e.g., 60°), a second acute angle (e.g., 58°), a third acute angle (e.g., 62°), the first acute angle (e.g., 60°), the second acute angle (e.g., 58°), and the third acute angle (e.g., 62°), as shown in FIG. 4. In another specific example, the asymmetric blade spacing of at least one plurality of blades of the plurality of propulsion assemblies no includes a first interblade angle of about 68.5°, a second interblade angle of about 76.3°, a third interblade angle of about 68.5°, a fourth interblade angle of about 73.3°, and a fifth interblade angle of about 73.4°. In related examples including five blades, the interblade angle can vary from the aforementioned five interblade angles by a small amount (e.g., ±.1°, ±.2°, ±.3°, etc.) and achieve a substantially identical function.

The asymmetric blade spacing can additionally or alternatively include fully asymmetric inter-blade azimuthal spacings, wherein the inter-blade spacing (e.g., the value of the angle) between any two blades of a propeller 114 is distinct from the inter-blade spacing between any other two blades of the propeller 114. The asymmetric blade spacing can additionally or alternatively include inter-blade azimuthal spacings of any suitable angular value that is different from (e.g., greater than, less than) 360° divided by the number of blades.

The asymmetric blade spacing is preferably determined by minimizing the variation in the acoustic spectrum across all multiples of the base propeller rotation frequency, and optionally with various practical constraints. Determining the asymmetric blade spacing in this manner preferably includes assuming that each blade of a propeller produces a characteristic period pressure signal p($\varphi$) =p($\varphi$+2$\pi$), where $$\varphi = \frac{2\pi t}{T}$$

with t representing time and T the period of revolution. The overall acoustic output (e.g., noise) of the set of propellers is a superposition of phased such pressure signals, $P(\phi) = \Sigma_{b=1}^{N} p(\phi - \phi_b)$, with $\phi_i$ representing angles of blades of the propeller on the hub and N the number of blades. Representing the acoustic output in the Fourier domain, i.e., $p(\phi) = \Sigma_{k=-\infty}^{\infty} c_k e^{ik\phi}$, such that $P(\phi) = \Sigma k = -\infty^{28} C_k e^{ik\phi}$, wherein $C_k = (\Sigma_{b=1}^{N} e^{-ik\phi_b}) c_k$, reduces the task of determining the asymmetric blade spacing to minimizing the variation in $C_k$ such that, e.g., $f_p = \Sigma k = 1^{\infty} |C_k|^p$ is minimal. For p>2, asymmetric blade spacings lead to such minimal solutions, and favor distributions that are more uniform wherein the uniformity increases with p. In some variations of determining the asymmetric blade spacing, spacing solutions can be further constrained by structural, performance, and/or packaging constraints. Preferably, the distributions wherein the first moment $g_0 = \Sigma_{b=1}^{N} e^{-1\phi_b} = 0$ are used (e.g., to avoid balancing issues); alternatively, distributions wherein the first moment is not equal to zero can be used. In a specific example of the above applied to a 5-bladed propeller under the additional constraints that the minimal spacing between blades should be greater than or equal to 68.5° and that the first moment $g_0 = 0$, the blade angle distribution $\{\phi_b\}_o = \{0°, 68.5°, 144.791°, 213.291°, 286.645°\}$ is a result that is independent of the power p for reasonable values of p≥3 and independent of the single blade spectral signal $\{ck\}$, and can be used in variations and examples of a propeller as described herein. Any similar blade angle distribution under the transformations $\phi'_b = \phi_b \times \delta, \phi'_b = -\phi_b$, or a combination thereof can additionally or alternatively be used. Variations of the blade angle distributions by a few tenths of a degree can additionally or alternatively be used to achieve the same or similar effects. However, in additional or alternative variations, the asymmetric blade spacing can be otherwise suitably determined.

The asymmetric blade spacing is preferably fixed (e.g., at the propeller 114 hub, at the propeller 114 head, etc.) for a given propeller 114 (e.g., of the plurality of propellers 114 corresponding to the plurality of propulsion assemblies 110), but can additionally or alternatively be adjustable (e.g., manually adjustable, automatically adjustable by an actuator, etc.). In aircraft variations including a plurality of propulsion assemblies 110, the asymmetric blade spacing for each propeller 114 of the plurality can be identical, different for each propeller 114 of the plurality, identical for a subset of the plurality and different for another subset of the plurality, or otherwise suitably represented by the plurality of propellers 114. The asymmetric blade spacing of each propeller 114 can be independently adjustable during operation by the control subsystem 120 (e.g., based on acoustic signature data). In variations wherein the asymmetric blade spacing (e.g., of each rotor) is fixed, the inter-blade spacing can be predetermined based on an optimization of the acoustic spectrum distribution. For example, the inter-blade spacing can be calculated to minimize the sum of the squares of the acoustic intensities as a function of frequency (e.g., to minimize the integral of the squared acoustic intensity). In the aforementioned example, the acoustic intensity as a function of frequency can be determined using a computational fluid dynamic simulation of the rotating blade and the resulting pressure perturbations (e.g., acoustic wave) at a point in space. In a related example, the acoustic intensity as a function of frequency can be measured using an acoustic sensor 122 (e.g., fixed at a point in space relative to the rotating blades), and the inter-blade spacing can be determined and effected at the propeller 114 (e.g., manually, during manufacturing, after manufacturing, dynamically during operation, etc.) by minimizing the integrated square of the acoustic intensity.

Figure 13:
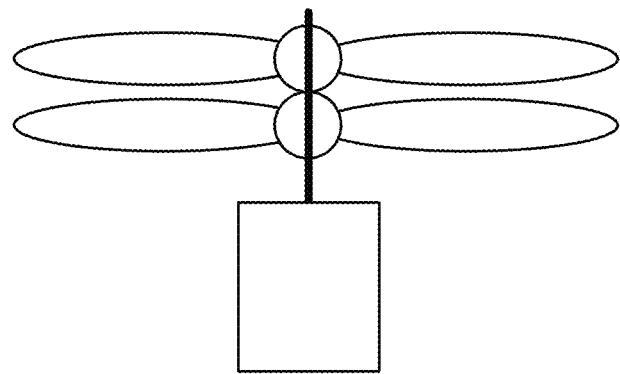
FIG. 13 depicts a side view of a variation of the propulsion assembly including two coaxial propellers.
Figure 14:
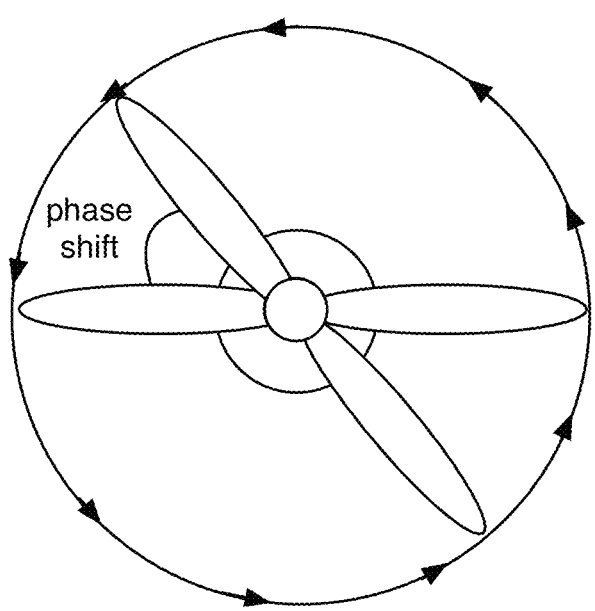
FIG. 14 depicts a top view of a variation of the propulsion assembly including two coaxial propellers shifted by an azimuthal phase shift during co-rotation.

In some variations, the plurality of blades can be defined by more than a single propeller 114 (e.g., by two or more coaxial propellers 114), and the asymmetric blade spacing can be achieved by way of an azimuthal shift between the two or more coaxial propellers 114 (e.g., during operation). For example, as shown in FIGS. 13 and 14, the plurality of blades of a propulsion assembly no can be further defined by a second propeller 114 coaxial with the first propeller 114. In such examples, the two coaxial propellers 114 rotate in the same direction during operation, and the propellers 114 are shifted by an azimuthal phase shift during operation (e.g., to achieve an X-shaped configuration, as shown in FIG. 3, and associated reduction in tonality of the emitted acoustic signature). The azimuthal phase shift between the plurality of coaxial, co-rotating propellers 114 can be dynamically controlled to achieve a variable asymmetric blade spacing. Such dynamic control can be based upon the acoustic output signature (e.g., automatically using feedback control), a command instruction (e.g., manually, via open-loop control, etc.), or otherwise suitably based.

The two or more propellers 114 in a coaxial, co-rotating configuration can include various numbers of blades. In one example, each of the first and second propellers 114 have two blades such that the plurality of blades defined by the first and second propeller 114 of the propulsion assembly no includes four blades. In another example, each of the first and second propellers 114 have three blades such that the plurality of blades defined by the first and second propeller 114 of the propulsion assembly 110 includes six blades. In another example, the first propeller 114 has three blades and the second propeller 114 has two blades such that the plurality of blades includes five blades. However, each propeller 114 of the two or more propellers 114 can include any suitable number of blades to define the plurality of blades of the propulsion assembly 110. In additional or alternative variations, any suitable number of propellers (e.g., two, three, four, etc.) having any suitable numbers of blades (e.g., two, three, four, etc.) can be used in a coaxial, co-rotating configuration to define the plurality of blades of a single propulsion assembly among the one or more propulsion assemblies.

3.1.2 Motor

The motor 112 of the propulsion assembly 110 functions to provide torque to the propeller 114 and thereby rotate the propeller 114 (e.g., to provide propulsive force to the aircraft). The motor 112 can also function to control the RPM of the propeller 114 during operation. In some variations, the motor 112 can function to dynamically adjust the RPM (e.g., in response to control instructions) during operation. The motor 112 preferably includes an electric motor 112, but can additionally or alternatively include any other suitable type of motor 112 or rotary actuator (e.g., an internal combustion engine, a gas turbine engine, etc.). The motor 112 is preferably directly connected to the propeller 114 (e.g., by a shaft, a direct linkage), but can alternatively be connected to the propeller 114 through a power transmission linkage (e.g., a gearbox, an offset shaft, a clutch, an indirect linkage, etc.). The motor 112 can also include a trim mechanism that functions to mechanically adjust the physical orientation of the propeller 114 (e.g., the blade pitch of each blade, the inter-blade spacing between each blade pair, etc.).

In variations wherein the motor 112 includes an electric motor 112, the electric motor 112 can include any suitable type of electric motor 112, such as: an electromagnetic motor 112, an electrostatic motor 112, a piezoelectric motor 112, and any other suitable type of motor 112. The electric motor 112 can be a self-commutated motor 112 (e.g., a brushed DC motor 112, a brushless DC motor 112, a switched reluctance motor 112, a universal AC-DC motor 112 or commutated electrically excited series or parallel wound motor 112, etc.) or an externally commutated motor 112 (e.g., an induction motor 112, a torque motor 112, a synchronous motor 112, doubly-fed electric motor 112, singly-fed electric motor 112, etc.). In alternative variations, the electric motor 112 can include a coreless propeller 114 motor 112, an axial propeller 114 motor 112, a stepper motor 112, and any other suitable type of electric motor 112. In some variations, the propeller 114 forms a portion of the electric motor 112 (e.g., a secondary winding of the motor 112, a propeller 114 of the motor 112 in electromagnetic communication with a stator of the motor 112, etc.). However, in additional or alternative variations, portions of the propulsion assembly 110 can form any suitable portion of the motor 112 (e.g., the propeller 114, the stator, the housing, the power source, etc.).

The propulsion assembly 110 (e.g., each propulsion assembly 110 of the plurality) can optionally include a tilt mechanism. The tilt mechanism functions to rotate the propeller 114 of the propulsion assembly 110 between a forward orientation (e.g., wherein the rotation axis of the propeller 114 is substantially parallel to a longitudinal axis of the aircraft) and a hover orientation (e.g., wherein the rotation axis of the propeller 114 is substantially parallel to a vertical axis of the aircraft) in variations wherein the aircraft is configured as a tiltrotor aircraft.

3.2 Control Subsystem 120

The system can include a control subsystem 120, which functions to control the one or more propulsion assemblies 110 of the system (e.g., in any suitable operating mode such as those previously described and/or other suitable operating modes). The control subsystem 120 preferably includes an onboard computer, but can additionally or alternatively include a remote computer communicatively coupled (e.g., via a radiofrequency transceiver) to the aircraft and the propulsion assemblies 110 thereof, and any other suitable computing system. The control subsystem 120 can additionally or alternatively include any other suitable components related to control and/or actuation of control surfaces of the aircraft.

The control subsystem 120 can include one or more acoustic sensors 122. The acoustic sensors 122 function to monitor the acoustic signature emitted by the system during operation. The acoustic sensors 122 can also function to provide feedback to the control subsystem 120 and thereby enable feedback control of the system (e.g., based on the emitted acoustic signature). The acoustic sensors 122 can include microphones, such as capacitor microphones, electret microphones, dynamic microphones, ribbon microphones, carbon microphones, piezo microphones, fiber optic microphones, laser microphones, MEMS microphones, an output such as a speaker utilized in reverse as a microphone, and any other suitable transducer for detecting acoustic waves. The microphones can be unidirectional, bi-directional, polydirectional, and/or omnidirectional microphones. The acoustic sensors 122 can be arranged proximal the propulsion assemblies 110 (e.g., incorporated into the aircraft), remote from the propulsion assemblies 110 (e.g., at a ground location, at a ground-based structure, etc.), within the interior of the aircraft (e.g., the cabin) or at the exterior surface of the aircraft, at an aerial vehicle distinct from the aircraft (e.g., a monitoring balloon, another aircraft, etc.), and any other suitable location. The system can include any suitable number of acoustic sensors 122 (e.g., a single acoustic sensor 122, an array of acoustic sensors 122 arranged remote from the system along one or more potential flightpaths, a set of acoustic sensors 122 arranged both at and remote from the aircraft, etc.).

3.3 Further Examples—System

A specific example of the system includes a plurality of propulsion assemblies 110 coupled to the aircraft, wherein each of the plurality of propulsion assemblies no includes a motor 112 and a plurality of blades defined by at least a first propeller 114 (e.g., and in some variations a second propeller) and that defines an asymmetric blade spacing. In this example, the first propeller 114 is coupled to the motor 112 and rotates at a rotation frequency during operation. This example also includes a control subsystem 120 coupled to the aircraft and communicatively coupled to the motor 112 of each of the plurality of propulsion assemblies 110, and the control subsystem 120 is operable to control the rotation frequency of each of the propellers 114 (e.g., first propellers 114, first and second propellers 114, etc.).

Figures 5A, 5B:
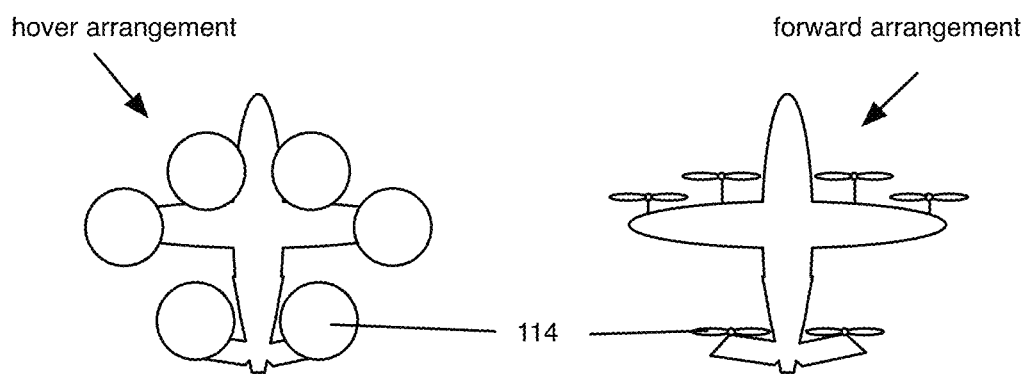
FIGS. 5A and 5B depict an example of the system implemented in conjunction with a tiltrotor aircraft defining a hover arrangement and a forward arrangement, respectively.

As shown in FIGS. 5A-5B, a specific example of the system includes a tiltrotor aircraft having six propulsion assemblies 110 operable between a hover arrangement and a forward arrangement. In this example, the propeller 114 of each of the six propulsion assemblies no is oriented such that the rotation axis of each propeller 114 is parallel to the vertical axis of the aircraft during operation in the hover arrangement, and the propeller 114 of each of the six propulsion assemblies no is oriented such that the rotation axis of each propeller 114 is parallel to the longitudinal axis of the aircraft during operation in the forward arrangement. In this example, each of the propellers 114 of the six propulsion assemblies no defines an asymmetric blade spacing between five blades (e.g., each of the plurality of propulsion assemblies no includes a single propeller 114, and the propeller 114 of each of the plurality of propulsion assemblies no defines exactly five blades), wherein the asymmetric blade spacing of each propeller 114 is fixed, different between each propeller 114, and within an RMS value of 5° of the symmetric spacing angle for each propeller 114. Each of the propellers 114 of the six propulsion assemblies 110 of this example includes controllable variable-pitch blades and is driven by a motor 112 including an electric motor 112 directly and rigidly coupled to the propeller 114 (e.g., the propeller 114 head of the propeller 114, the hub of the propeller 114, etc.) by a shaft. In this example, the plurality of propulsion assemblies no is operable in a spread-RPM mode as described above.

In variations and examples of the system implemented at a tiltrotor aircraft operable between a forward arrangement and hover arrangement, the controllable operating parameters of the plurality of propulsion assemblies 110 (e.g., the RPM of each propeller 114, the phase of each propeller 114, etc.) can differ between operation in the forward arrangement and the hover arrangement. For example, the system can be operated in the spread-RPM mode during operation in the hover arrangement and in the phase-controlled mode during operation in the forward arrangement. In another example, the system can be operated in the spread-RPM mode defining a first set of RPM values corresponding to the propellers 114 of the plurality of propulsion assemblies 110 during operation in the hover arrangement and operated in the spread-RPM mode defining a second, distinct set of RPM values corresponding to the propellers 114 of the plurality of propulsion assemblies 110 during operation in the forward arrangement. The RPM values are preferably lower in the forward arrangement than in the hover arrangement but can additionally or alternatively include any suitable values in either the forward or hover arrangement. The system can additionally or alternatively be otherwise suitably operated in any suitable operating mode during operation in the forward and/or hover arrangements, in such variations and examples of the system implemented at an aircraft configured to operate in such arrangements (e.g., tiltrotor aircraft).

In another specific example, the system includes a fixed wing aircraft having a plurality of propulsion assemblies 110, each of the plurality of propulsion assemblies 110 driven by a motor 112 including an electric motor 112. In this example, each propeller 114 defines an asymmetric blade spacing perturbed from a symmetric angle (e.g., 72° for a five bladed rotor) by an RMS angle of 5°, wherein the asymmetric spacing is randomly determined (e.g., calculated) within the aforementioned constrained RMS value and adjusted post-calculation such that no two adjacent blades of any of the plurality of propellers 114 are separated by the same angular value as any other two adjacent blades (e.g., on the same propeller 114, on different propellers 114, etc.).

Figure 6:
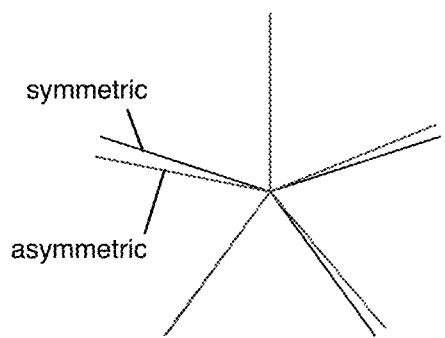
FIG. 6 depicts a comparison between an example relative blade spacing of a symmetrically-spaced propeller and an asymmetrically-spaced rotor.
Figure 7:
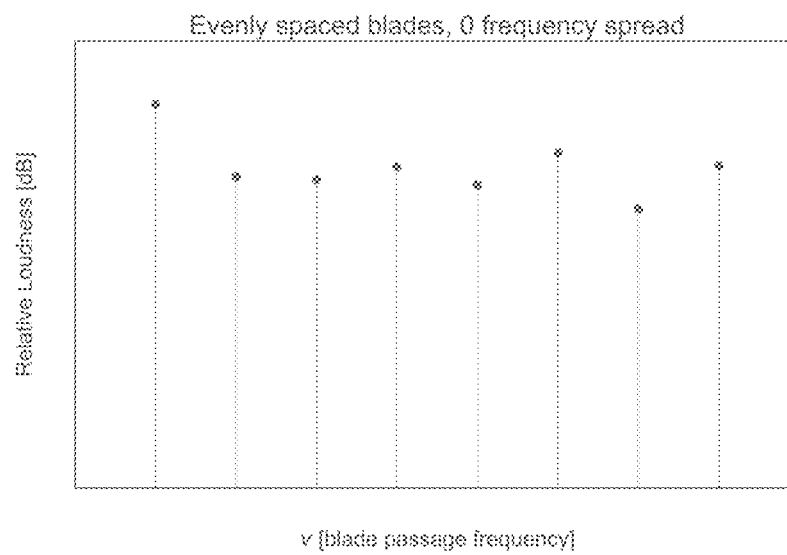
FIG. 7 depicts an example frequency spectrum of an acoustic signature emitted by a propeller having equally-spaced blades.
Figure 8:
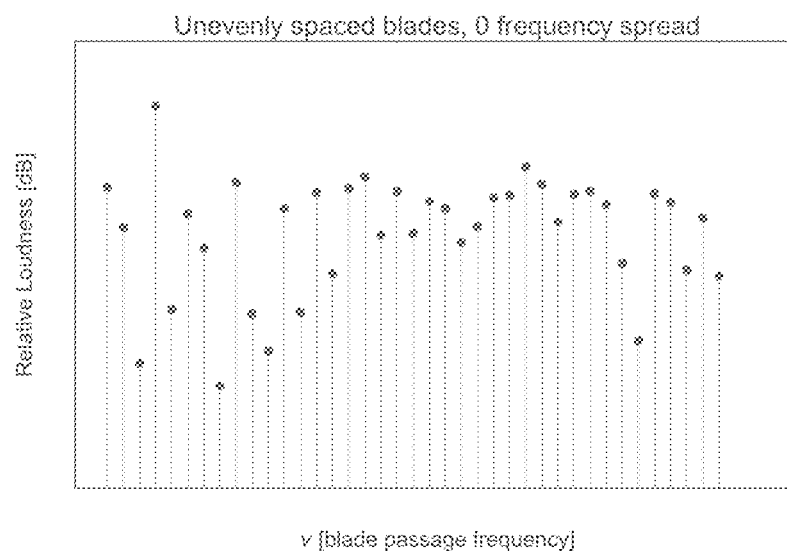
FIG. 8 depicts an example frequency spectrum of an acoustic signature emitted by a propeller having asymmetric blade spacing.

In another specific example of the system, each of a plurality of propulsion assemblies 110 includes an identical five-bladed propeller 114 defining asymmetrically (e.g., unevenly) spaced blades, the centerlines (e.g., from base to tip) perturbed from the symmetric spacing as shown by example in FIG. 6. FIG. 7 depicts an example frequency spectrum of the acoustic signature corresponding to a symmetrically (e.g., evenly) spaced five-bladed propeller 114 at a given RPM value, and, in contrast, FIG. 8 depicts an example frequency spectrum of the acoustic signature corresponding to an asymmetrically spaced five-bladed propeller 114 as previously described and as shown in FIG. 6.

4. Method

As shown in FIG. 2, the method 200 can include: providing a propulsion assembly, wherein the propulsion assembly generates an acoustic signature during operation S210; and controlling the propulsion assembly to reduce a psychoacoustic penalty of the acoustic signature S220.

4.1 Providing propulsion assemblies S210

Block S210 includes providing a propulsion assembly, wherein the propulsion assembly generates an acoustic signature during operation. Block S210 functions to provide a propulsive mechanism to an aircraft, wherein the propulsive mechanism includes a propeller. The propulsion assembly provided is preferably a propulsion assembly substantially as described above in Section 3 and/or variations thereof; however, the propulsion assembly can additionally or alternatively include any suitable mechanism for providing propulsive force to a vehicle, wherein the mechanism includes a propeller.

Block S210 preferably includes providing a plurality of propulsion assemblies, wherein each of the plurality of propulsion assemblies is configured to provide propulsive force to the aircraft (e.g., vertical force during aircraft operation in a hover mode, horizontal force during aircraft operation in a forward mode, etc.); however, Block S210 can alternatively include providing a single propulsion assembly (e.g., corresponding to a single main propeller wherein the aircraft is a helicopter) and/or a plurality of propulsion assemblies wherein a subset of the plurality are configured to provide stabilizing force to the aircraft in lieu of propulsive force (e.g., wherein one of the plurality of propellers is configured as a tail propeller and/or otherwise rotating about an axis that is not parallel to the rotation axis of the remaining propellers of the plurality).

Block S210 can include providing a propulsion assembly wherein the blades of the propeller of the propulsion assembly are asymmetrically spaced (e.g., wherein the plurality of blades of one or more propulsion assemblies defines an asymmetric blade spacing). The propulsion assembly thus provided is preferably a propulsion assembly substantially as described above in Section 3, and can include blades that are asymmetrically spaced substantially in the manner described above and/or in any other suitable manner.

In a specific example, Block S210 can include providing a plurality of propulsion assemblies including asymmetric blade spacing, wherein the asymmetric blade spacing of the plurality of blades of each of the plurality of propulsion assemblies is identical. In an alternative specific example, the asymmetric blade spacing of the plurality of blades of two or more of the plurality of propulsion assemblies can be different.

In a variation, Block S210 includes providing a propulsion assembly including a propeller having adjustable blade spacing. The blade spacing can be manually adjustable (e.g., during time periods in which the aircraft is grounded or otherwise not operating; wherein the blades are captive in a hub including a circumferential fixture or groove about which the blades' azimuthal positions can be manually adjusted and fixed by one or more fasteners; etc.), dynamically adjustable (e.g., during time periods in which the aircraft is operating; wherein the blades' azimuthal positions can be controlled by a motorized actuator; etc.), and/or otherwise suitably adjustable. In alternative variations, Block S210 can include providing a propulsion assembly including a propeller having fixed blade spacing (e.g., symmetric blade spacing, asymmetric blade spacing, etc.).

4.2 Controlling propulsion assemblies S220

Block S220 includes controlling the propulsion assembly to reduce a psychoacoustic penalty of the acoustic signature. Block S220 functions to operate the propulsion assembly (e.g., provided in accordance with one or more variations of Block S210) such that a psychoacoustic penalty of the acoustic signature generated by the propulsion assembly during operation is reduced. In variations wherein the aircraft at which the method 200 is performed includes a plurality of propulsion assemblies, Block S220 preferably includes controlling the plurality of propulsion assemblies (e.g., to reduce a psychoacoustic penalty of the acoustic signature generated by the plurality of propulsion assemblies); however, Block S220 can alternatively include controlling a single propulsion assembly even in cases wherein the aircraft includes a plurality of propulsion assemblies, or otherwise suitably controlling one or more propulsion assemblies.

Figure 9:
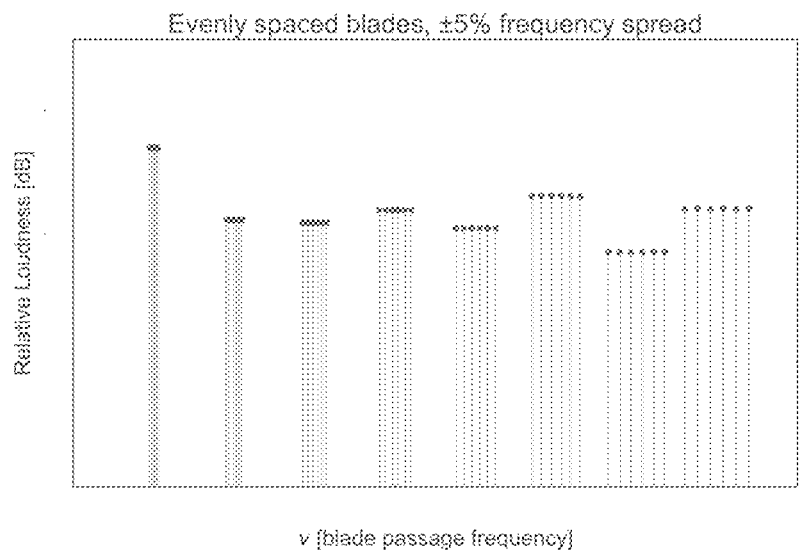
FIG. 9 depicts an example frequency spectrum of an acoustic signature emitted by a plurality of propellers operated at a range of RPM values.

In variations, Block S220 can include controlling a plurality of the propulsion assemblies at a range of RPM values, wherein at least one propeller is rotated at an RPM value that differs from the RPM value at which at least one other propeller is rotated. In this variation, Block S220 can function to spread the acoustic spectrum substantially as described above in relation to the spread-RPM operating mode. However, Block S220 can additionally or alternatively include controlling the propulsion assembly at any suitable RPM value or range of RPM values enabled by the motor (e.g., by the operating characteristics of the motor, the torque curve of the motor, etc.). FIG. 9 depicts an example frequency spectrum of the acoustic signature emitted by six propellers operated according to a specific example of Block S220 wherein the RPM value of each propeller is deviated by ±5% about a nominal value (e.g., wherein the rotation frequency of each of the plurality of propulsion assemblies is separated from the rotation frequency of at least one other of the plurality of propulsion assemblies by at least 5% of a nominal rotation frequency, the median rotation frequency, the mean rotation frequency, etc.).

Block S220 can include dynamically adjusting the RPM value(s) of one or more propellers during aircraft operation, which can function to reduce the psychoacoustic penalty of the emitted acoustic signature. Dynamically adjusting the RPM value(s) of one or more propellers can also function to control the flight of the aircraft (e.g., by adjusting the thrust generated by the rotor); however, adjusting the RPM value can additionally or alternatively be performed simultaneously and/or in conjunction with adjusting the blade pitch or other propeller aeromechanical property (e.g., using a trim mechanism of the motor of the propulsion assembly) to hold the thrust substantially constant at variable RPM. In some variations, Block S220 can include simultaneously controlling each of a plurality of propellers to adjust the thrust distribution (e.g., in a hover arrangement so as to create a moment about one or more axes of the aircraft) and reduce the psychoacoustic penalty (e.g., by spreading the peaks or otherwise reducing the tonality of the acoustic spectrum) by way of the same action. Dynamically adjusting the spread of the RPM values of two or more propellers can be performed based on measured (or otherwise suitably obtained) feedback; for example, Block S220 can include receiving (e.g., from a ground-based acoustic sensor) an acoustic power spectrum of the emitted acoustic signature as perceived from a remote observer along the aircraft's flightpath (e.g., in real time, in near real time, etc.), determining that one or more peaks in the acoustic power spectrum are greater than a predetermined threshold (e.g., determining at an onboard computing system, determining at a remote computing system, etc.), and adjusting the spread in RPM values between the two or more propellers until the one or more peaks are below the predetermined threshold. In a related example, the threshold can be dynamically determined (e.g., based on a received instruction, based on a time of day and associated noise ordinance, etc.).

Figure 10:
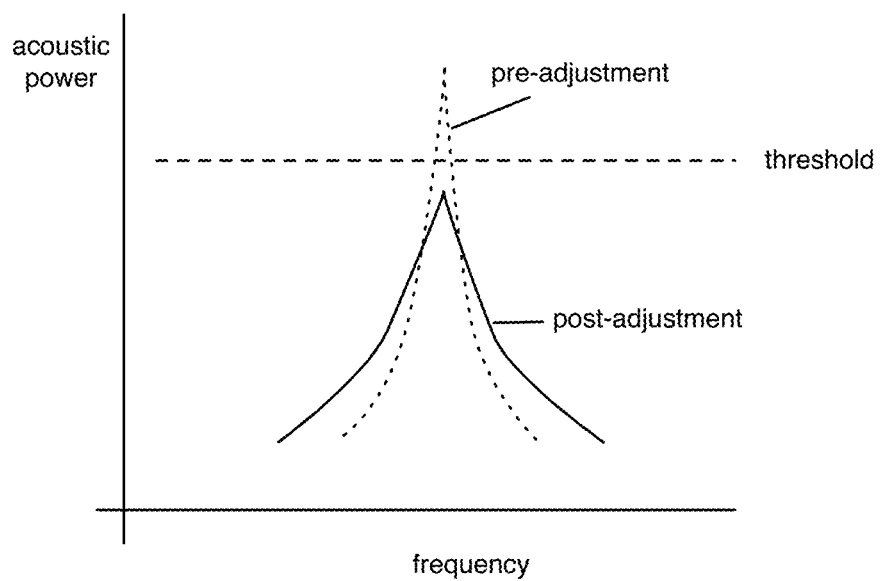
FIG. 10 depicts an example of dynamic acoustic peak spreading based on feedback in accordance with an example implementation of the method.

Block S220 can include adjusting the blade spacing of one or more propellers, which can function to reduce the psychoacoustic penalty of the acoustic signature emitted by the one or more propellers. For example, Block S220 can include adjusting the asymmetric blade spacing of the plurality of blades of at least one of the plurality of propulsion assemblies during operation. Adjusting the blade spacing can be performed based on measured (or otherwise suitably obtained) feedback; for example, Block S220 can include detecting (e.g., using an onboard acoustic sensor, a ground-based acoustic sensor, in accordance with one or more variations of Block S225, etc.) an acoustic power spectrum at a spectral band corresponding to a harmonic of a BPF of a propeller, determining that the peak power within the band is greater than a threshold level (e.g., a threshold dB level), and adjusting the blade spacing of one or more propellers (e.g., a propeller closest to the acoustic sensor used to measure the feedback) until the peak power within the band is below the threshold, as shown in FIG. 10. However, adjusting the blade spacing can additionally or alternatively be performed with any other suitable basis and at any suitable time relative to flight (e.g., pre-flight modeling based on contextual or environmental characteristics such as temperature, humidity, etc.). In some variations, the blades can have fixed spacing and Block S220 can omit blade spacing adjustment.

Figure 11:
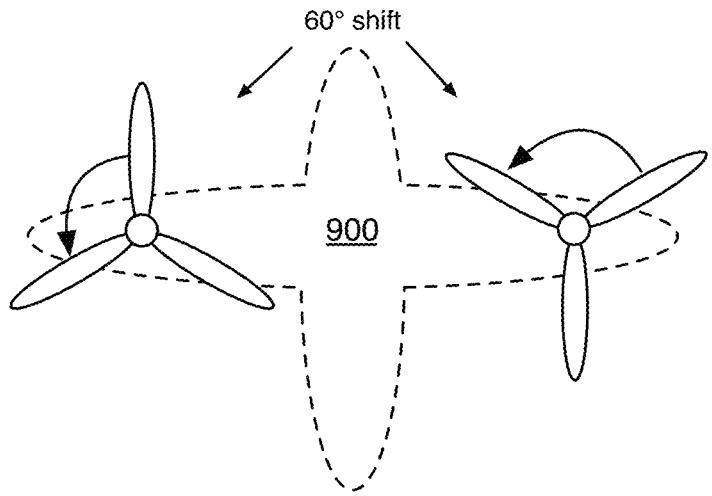
FIG. 11 depicts an example of controlling a relative position between two propellers in accordance with an example implementation of the method.

Block S220 can include shifting and/or precisely controlling the phase (e.g., relative azimuthal positions) of one or more propellers, which can function to reduce the psychoacoustic penalty of the acoustic signature emitted by the one or more propellers. For example, Block S220 can include shifting the relative phase of each of a set of propellers to maximize a phase difference between the azimuthal position(s) of the blades of the propellers (e.g., enforcing a 60° relative phase shift between two three bladed propellers, as shown by example in FIG. 11), which can alter the perception of the audible sound generated by the set of propellers as received by a listener at a fixed location relative to the set of propellers, and reduce the psychoacoustic penalty of the sound.

In variations wherein the variable blade spacing is achieved by way of multiple coaxial propellers (e.g., as described above in Section 3), Block S220 can include maintaining and/or changing the phase shift between the coaxial propellers during rotation. For example, wherein the plurality of blades of least one propulsion assembly is further defined by a second propeller coaxial with the first propeller, Block S220 can include rotating the first propeller and second propeller in a same direction to generate thrust, wherein the first propeller is shifted by an azimuthal phase shift from the second propeller while rotating the first propeller and second propeller. The azimuthal phase shift can be varied dynamically and/or automatically during operation consistently with the performance of Block S220 (e.g., wherein Block S220 includes adjusting the azimuthal phase shift based on the acoustic signature data, command instructions, etc.).

In variations, Block S220 can include controlling the propulsion assemblies to modulate the thrust distribution. The thrust distribution can be modified to achieve a command goal (e.g., a particular vehicle maneuver) while simultaneously satisfying an acoustic output constraint (e.g., measured against acoustic signature data determined as in one or more variation of Block S225). For example, Block S220 can include modulating the thrust distribution based on the acoustic signature data in response to receiving a command instruction at the onboard control system.

4.3 Determining acoustic signatures S225

The method 200 can include Block S225, which includes: determining an acoustic signature of the propulsion assembly. Block S225 functions to provide an acoustic metric for use in other Blocks of the method 200 (e.g., as a feedback input to one or more variations of Block S220). Block S225 can also function to provide information to a vehicle operator (e.g., a pilot onboard the aircraft, a remote teleoperator, etc.) regarding the acoustic output of the vehicle (e.g., in order to control vehicle operation in compliance with sound ordinances associated with a geographic region, in order to monitor vehicle operation for anomalous acoustic signatures or noises, etc.).

Block S225 can include measuring the acoustic signature using an acoustic sensor; in such cases, Block S225 is preferably performed at least in part at an acoustic sensor substantially as described above in Section 3, but can additionally or alternatively be performed using any other suitable sensor or mechanism (e.g., a user-input device to record a human observer's perception of the sound). The sensor can be an aircraft sensor (e.g., wherein the acoustic sensor is arranged at and coupled to the aircraft), a ground sensor (e.g., wherein the acoustic sensor is arranged at a ground-based infrastructure component), and/or any other suitable sensor or combination of sensors (e.g., a set of sensors wherein a subset are ground sensors and another subset are aircraft sensors).

Block S225 can additionally or alternatively include determining the acoustic signature data utilizing an acoustic model of the aircraft. The acoustic model preferably describes the acoustic signature output by the aircraft as a function of the operational state of the propulsion assemblies of the aircraft (e.g., RPM, blade pitch, blade spacing, etc.). The acoustic model can be predetermined (e.g., based on simulated acoustic output, based on empirical measurements, etc.), dynamically determined (e.g., updated using online training methods, validated against acoustic measurements collected during regular operation, etc.), or otherwise suitably determined.

In variations, Block S225 can include receiving the acoustic signature data at the onboard control system from an acoustic sensor (e.g., measuring the acoustic signature data), and the method can include a variation of Block S220 including adjusting the rotation frequency of at least one of the plurality of propulsion assemblies based on the acoustic signature data. For example, the acoustic signature data can indicate a degree of tonality in the acoustic output that is greater than a threshold value, and Block S220 can include automatically increasing the spread of the RPM values of each of the plurality of propulsion assemblies to reduce the tonality below the threshold value.

In variations of the method 200 and Blocks thereof described above, aspects of any Block (e.g., Blocks S210, S220, S225, etc.) described in relation to a single propulsion assembly can be applied to a plurality of propulsion assemblies. For example, variations of Block S210 including providing a propulsion assembly including a propeller having asymmetric blade spacing can include providing a plurality of propulsion assemblies wherein each propeller defines an asymmetric blade spacing (e.g., an equivalently asymmetric blade spacing across the plurality of rotors; a different asymmetric blade spacing pattern for each of the plurality of propellers, etc.). However, aspects of Blocks described in relation to a single propeller or propulsion assembly can be otherwise suitably applied to a plurality of propulsion assemblies.

4.4 Further Examples—Method

In a specific example, the method 200 includes providing a plurality of propulsion assemblies, wherein each of the plurality of propulsion assemblies includes a motor and a plurality of blades defined by at least a first propeller. In this example, the method includes controlling the plurality of propulsion assemblies of the aircraft to generate thrust, which generates an acoustic signature as a byproduct of thrust generation. The plurality of propulsion assemblies thus generates an acoustic signature that defines an acoustic power distribution (e.g., a distribution of acoustic power as a function of frequency) in addition to a thrust distribution (e.g., a geometric distribution of thrust about the aircraft to define a set of forces and moments on the aircraft). In this example, the method includes determining acoustic signature data at the onboard control system (e.g., indicative of the acoustic signature of the aircraft), and rotating each of the plurality of propulsion assemblies at a different frequency based on the acoustic signature data to modulate the acoustic power distribution of the acoustic signature while simultaneously substantially maintaining the thrust distribution. Maintaining the thrust distribution while changing the acoustic power distribution can include varying the blade pitch of the plurality of blades of the propellers (e.g., to increase or decrease the angle of attack of the blades in proportion to the decrease or increase in rotation frequency, respectively). In alternative examples, the method can include allowing the thrust distribution to change in order to modulate the acoustic power distribution (e.g., creating a moment or net force on the aircraft intentionally with a byproduct of reducing the psychoacoustic penalty of the acoustic signature).

Figure 12:
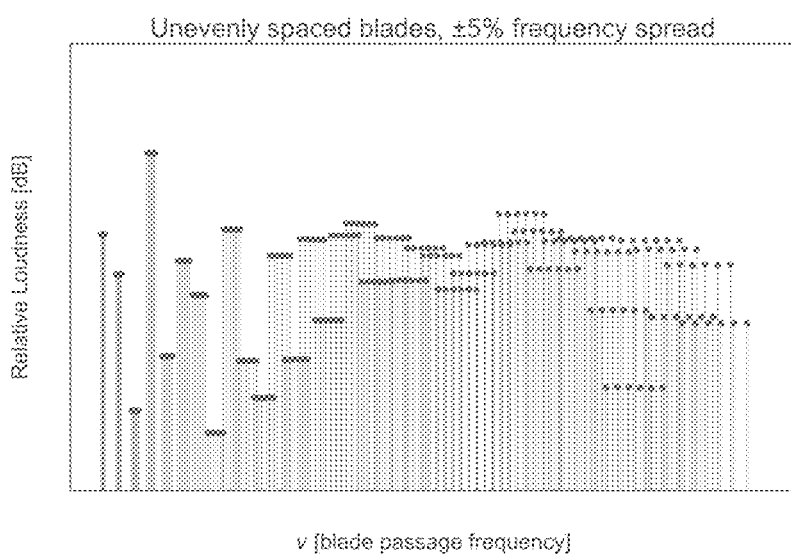
FIG. 12 depicts an example frequency spectrum of an acoustic signature emitted by a plurality of propellers having asymmetrically spaced blades operated at a range of RPM values, in accordance with an example implementation of the method in conjunction with an example embodiment of the system.

In another specific example, the method 200 includes: providing a set of six propulsion assemblies, wherein the propeller of each of the six propulsion assemblies is asymmetrically spaced, wherein each propeller includes five blades separated by five inter-blade spacing values, each of the five values deviating from the symmetric spacing angle by less than 5°; and, controlling the plurality of propulsion assemblies to rotate the propeller of each of the plurality at a range of RPM values that deviate by less than or equal to 5% of a nominal RPM value, wherein the nominal RPM value is determined based on a desired thrust output of the propulsion assembly and each value of the range of RPM values is determined in conjunction with an adjusted pitch angle to achieve the desired thrust output at the RPM value. FIG. 12 depicts an example frequency spectrum of the acoustic signature generated in accordance with this example of the method, wherein six propulsion assemblies including asymmetrically spaced blades are operated at a range of RPM values in order to reduce the psychoacoustic penalty of the emitted acoustic signature (e.g., by reducing the tonality of the acoustic spectrum).

The system and method of the preferred embodiment and variations thereof can be embodied and/or implemented at least in part as a machine configured to receive a computer-readable medium storing computer-readable instructions. The instructions are preferably executed by computer-executable components preferably integrated with the system and one or more components thereof. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components, and every combination and ordering of the various method blocks, which can be combined in any suitable permutation or combination and/or omitted in whole or in part from variations of the preferred embodiments.

As a person skilled in the art will recognize from the previous detailed description and from the figures and claims, modifications and changes can be made to the preferred embodiments of the invention without departing from the scope of this invention defined in the following claims.

What is claimed is:

1. A system for reducing a psychoacoustic penalty of acoustic noise emitted by a tiltrotor aircraft by reducing the tonality of the acoustic spectrum emitted by the aircraft during operation, comprising:
a tiltrotor aircraft comprising a right wing and a left wing;
a plurality of propulsion assemblies coupled to the aircraft, said plurality of propulsion assemblies located at different locations on said aircraft, said plurality of propulsion assemblies operable between a hover arrangement and a forward arrangement, wherein each of the plurality of propulsion assemblies comprises:
a motor, and
a plurality of blades defined by at least a first propeller, wherein the first propeller is coupled to the motor and rotates at a rotation frequency, wherein the plurality of blades defines an asymmetric blade spacing, wherein said plurality of propulsion assemblies comprises:
a right wing mounted right side rotor assembly;
a left wing mounted left side rotor assembly
a right side rear rotor assembly; and
a left side rear rotor assembly; and
a control subsystem coupled to the aircraft and communicatively coupled to the motor of each of the plurality of propulsion assemblies, wherein the control system is operable to control the plurality of propulsion assemblies to generate thrust in a hover mode, thereby generating a thrust distribution around the tiltrotor aircraft in the hover mode, and wherein the control subsystem is operable to control the rotation frequency of the first propeller of each of the plurality of propulsion assemblies in a spread-RPM mode, and wherein the control system is operable to determine acoustic signature data, and wherein the control system is further operable to control the phase of the propellers of the plurality of propulsion assemblies relative to each other in a phase controlled mode, and wherein the control system is operable to maintain the thrust distribution around the tiltrotor aircraft in the hover mode by adjusting the pitch angle of each of the plurality of propulsion assemblies based upon the respective rotation frequency in order to maintain a desired thrust for each of the plurality of propulsion assemblies, wherein at least one of said plurality of propulsion assemblies rotates at a different rotation frequency than another of said plurality of propulsion assemblies.

2. The system of claim 1, wherein the asymmetric blade spacing of the plurality of blades of each of the plurality of propulsion assemblies is identical.

3. The system of claim 1, wherein the first propeller of each of the plurality of propulsion assemblies defines exactly five blades.

4. The system of claim 3, wherein the asymmetric blade spacing of at least one plurality of blades of the plurality of propulsion assemblies comprises: a first interblade angle of about 68.5°, a second interblade angle of about 76.3°, a third interblade angle of about 68.5°, a fourth interblade angle of about 73.3°, and a fifth interblade angle of about 73.4°.

5. The system of claim 1, wherein the plurality of blades of least one propulsion assembly is further defined by a second propeller coaxial with the first propeller, wherein the first propeller and second propeller rotate in a same direction during operation, and wherein the first propeller is shifted by an azimuthal phase shift from the second propeller during operation.

6. The system of claim 5, wherein the first propeller defines exactly two blades of the plurality of blades and the second propeller defines exactly two blades of the plurality of blades.

7. The system of claim 5, wherein the azimuthal phase shift between the first propeller and the second propeller is dynamically controlled by the control subsystem during operation based on the acoustic output signature.

8. The system of claim 1, wherein the asymmetric blade spacing of each propeller is independently adjustable during operation by the control subsystem.

9. The system of claim 1, wherein the plurality of propulsion of assemblies is operable between a plurality of modes by the control subsystem, wherein the plurality of modes includes a spread-RPM mode, wherein the spread-RPM mode comprises rotation of the first propeller of each of the plurality of propulsion assemblies at a different rotation frequency during operation.

10. A system for reducing a psychoacoustic penalty of acoustic noise emitted by a tiltrotor aircraft, comprising:
a tiltrotor aircraft comprising a right wing and a left wing;
a plurality of propulsion assemblies coupled to the aircraft, said plurality of propulsion assemblies operable between a hover arrangement and a forward arrangement, wherein each of the plurality of propulsion assemblies comprises:
a motor, and
a plurality of blades defined by at least a first propeller, wherein the first propeller is coupled to the motor and rotates at a rotation frequency, wherein the plurality of blades defines an asymmetric blade spacing, wherein said plurality of propulsion assemblies comprises:
a right wing mounted right side rotor assembly;
a left wing mounted left side rotor assembly a right side rear rotor assembly; and
a left side rear rotor assembly; and
a control subsystem coupled to the aircraft and communicatively coupled to the motor of each of the plurality of propulsion assemblies, wherein the control system is operable to control the plurality of propulsion assemblies to generate thrust in a hover mode, thereby generating a thrust distribution around the tiltrotor aircraft in the hover mode, and wherein the control subsystem is operable to control the rotation frequency of the first propeller of each of the plurality of propulsion assemblies in a spread-RPM mode, and wherein the control system is operable to determine acoustic signature data, and wherein the control system is operable to maintain the thrust distribution around the tiltrotor aircraft in the hover mode by adjusting the pitch angle of each of the plurality of propulsion assemblies based upon the respective rotation frequency in order to maintain a desired thrust for each of the plurality of propulsion assemblies.

11. The system of claim 10 wherein said control subsystem is further operable to allow the thrust distribution change from the desired thrust distribution in order to modulate the acoustic power distribution.

* * * * *